US012315053B2

(12) United States Patent
Bagherinezhad et al.

(10) Patent No.: US 12,315,053 B2
(45) Date of Patent: May 27, 2025

(54) IMAGE CLASSIFICATION THROUGH LABEL PROGRESSION

(71) Applicant: Apple Inc., Cupertino, CA (US)

(72) Inventors: Hessam Bagherinezhad, Seattle, WA (US); Maxwell Horton, Los Angeles, CA (US); Mohammad Rastegari, Kirkland, WA (US); Ali Farhadi, Seattle, WA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/544,288

(22) Filed: Dec. 18, 2023

(65) Prior Publication Data
US 2024/0144566 A1 May 2, 2024

Related U.S. Application Data

(60) Division of application No. 17/308,032, filed on May 4, 2021, now Pat. No. 11,887,225, which is a
(Continued)

(51) Int. Cl.
*G06F 18/214* (2023.01)
*G06F 18/241* (2023.01)
(Continued)

(52) U.S. Cl.
CPC .......... *G06T 11/60* (2013.01); *G06F 18/2148* (2023.01); *G06F 18/241* (2023.01);
(Continued)

(58) Field of Classification Search
CPC ...... G06V 10/82; G06V 20/52; G06V 10/454; G06V 10/764; G06V 40/10; G06V 10/44;
(Continued)

(56) References Cited

U.S. PATENT DOCUMENTS 10,497,122 B2 *  12/2019  Zhang ................... G06N 3/088
2018/0268307 A1    9/2018  Kobayashi
2019/0205625 A1 *  7/2019  Luo ........................ G06N 3/088

FOREIGN PATENT DOCUMENTS

CN      105354595 A       2/2016
CN      106446927 A       2/2017
(Continued)

OTHER PUBLICATIONS

Ba, et al., "Do Deep Nets Really Need to be Deep?" Advances in Neural Information Processing Systems, 2014, pp. 2654-2662.
(Continued)

*Primary Examiner* — Tuan H Nguyen
(74) *Attorney, Agent, or Firm* — BAKERHOSTETLER

(57) ABSTRACT

Systems and methods are disclosed for training neural networks using labels for training data that are dynamically refined using neural networks and using these trained neural networks to perform detection and/or classification of one or more objects appearing in an image. Particular embodiments may generate a set of crops of images from a corpus of images, then apply a first neural network to the set of crops to obtain a set of respective outputs. A second neural network may then be trained using the set of crops as training examples. The set of respective outputs may be applied as labels for the set of crops.

20 Claims, 14 Drawing Sheets

Related U.S. Application Data continuation of application No. 16/386,151, filed on Apr. 16, 2019, now Pat. No. 11,030,486.

(60) Provisional application No. 62/660,901, filed on Apr. 20, 2018.

(51) Int. Cl.

| | |
|---|---|
| G06N 3/045 | (2023.01) |
| G06N 3/08 | (2023.01) |
| G06T 11/60 | (2006.01) |
| G06V 10/44 | (2022.01) |
| G06V 10/764 | (2022.01) |
| G06V 10/82 | (2022.01) |
| G06V 20/52 | (2022.01) |
| G06V 40/10 | (2022.01) |
| G06V 20/68 | (2022.01) |

(52) U.S. Cl.
CPC ............... *G06N 3/045* (2023.01); *G06N 3/08* (2013.01); *G06V 10/454* (2022.01); *G06V 10/764* (2022.01); *G06V 10/82* (2022.01); *G06V 20/52* (2022.01); *G06V 40/10* (2022.01); *G06T 2210/22* (2013.01); *G06V 20/68* (2022.01)

(58) Field of Classification Search
CPC .......... G06V 20/68; G06N 3/08; G06N 3/045; G06T 11/60; G06T 2210/22; G06F 18/241; G06F 18/214
See application file for complete search history.

(56) References Cited

FOREIGN PATENT DOCUMENTS

| | | |
|---|---|---|
| CN | 107085585 A | 8/2017 |
| CN | 107358157 A | 11/2017 |
| CN | 107609587 A | 1/2018 |
| JP | 2013114596 A | 6/2013 |

OTHER PUBLICATIONS

Bagherinezhad, et al., "Label Refinery: Improving ImageNet Classification Through Label Progression," University of Washington, May 2018.
Bucila, et al., "Model Compression," Proceedings of the 12th ACM SIGKKD International Conference on Knowledge Discovery and Data Mining, 2006, pp. 535-541.
Cai, et al., "Exploiting Known Taxonomies in Learning Overlapping Concepts," IJCAI, 2007, vol. 7, pp. 708-713.
Deng, et al., "ImageNet: A Large-Scale Hierarchical Image Database," IEEE Conference on Computer Vision and Pattern Recognition, 2009, pp. 248-255.
He, et al., "Deep Residual Learning for Image Recognition," Proceedings of the IEEE Conference on Computer Vision and Pattern Recognition, 2016, pp. 770-778.
Hinton, et al., Distilling the Knowledge in a Neural Network, Mar. 2015.
Howard, et al., "MobileNets: Efficient Convolutional Neural Networks for Mobile Vision Applications," Apr. 2017.
Huang, et al., "Transfer Learning with Deep Convolutional Neural Network for SAR Target Classification with Limited Labeled Data," Remote Sensing, Aug. 2017, vol. 9, No. 9, pp. 1-21.
Ioffe, et al., "Batch Normalization: Accelerating Deep Network Training by Reducing Internal Covariate Shift," International Conference on Machine Learning, 2015, pp. 118-156.
Kingma, et at., "Adam: A Method for Stochastic Optimization," ICLR Conference, 2015.
Krizhevsky, et al., "ImageNet Classification with Deep Convolutional Neural Networks," Advances in Neural Information Processing Systems, 2012, pp. 1097-1105.
Li, et al., "Learning from Noisy Labels with Distillation," Open Access Version from ICCV, provided by the Computer Vision Foundation, 2017.
Li, et al., "Learning Small-Size DNN with OUTPUT-Distribution-Based Criteria," 15th Annual Conference of the International Speech Communication Association, 2014.
McAuley, et al., "Optimization of Robust Loss Functions for Weakly-Labeled Image Taxonomies," Sep. 2012.
Miller, et al., "Introduction to WordNet: An On-Line Lexical Database," International Journal of Lexicography, 1990, vol. 3, No. 4, pp. 235-244.
Miyato, et al., "Distributional Smoothing by Virtual Adversarial Training," ICLR Conference, 2016.
Nguyen, et al., "Deep Neural Networks are Easily Fooled: high Confidence Predictions for Unrecognizable Images," Proceedings of the IEEE Conference on Computer Vision and Pattern Recognition, 2015, pp. 427-436.
Paszke, et al., "Automatic Differentiation in PyTorch," 31st Conference on Neural Information Processing Systems, 2017.
Pereyra, et al., "Regularizing Neural Networks by Penalizing Confident Output Distributions," Under review as a conference paper at ICLR 2017.
Rastegari, et al., "XNOR-Net: ImageNet Classification Using Binary Convolutional Neural Networks," European Conference on Computer Vision, 2016, pp. 525-542.
Redmon, et al., "Yolo9000: Better, Faster, Stronger," IEEE Conference on Computer Vision and Pattern Recognition, 2017, pp. 6517-6525.
Reed, et al., "Training Deep Neural Networks on Noisy Labels with Bootstrapping," Accepted as a workshop contribution at ICLR 2015.
Romero, et al., "FitNets: Hints for Thin Deep Nets," ICLR Conference, 2015.
Shen, et al., "In Teacher We Trust: Learning Compressed Models for Pedestrian Detection," Dec. 2016.
Shrivastava, et al., "Learning from Simulated and Unsupervised Images through Adversarial Training," IEEE Conference on Computer Vision and Pattern Recognition, 2017.
Simonyan, et al., "Very Deep Convolutional Networks for Large-Scale Image Recognition," ICLR Conference, 2015.
Szegedy et al., "Inception-v4, Inception-ResNet and the Impact of Residual Connections on Learning," AAAI vol. 4, 2017.
Szegedy, et al., "Going Deeper with Convolutions," Open Access version from ICCV, provided by the Computer Vision Foundation, 2015.
Szegedy, et al., "Rethinking the Inception Architecture for Computer Vision," Proceedings of the IEEE Conference on Computer Vision and Pattern Recognition, 2016, pp. 2818-2826.
Tuytelaars, et al., "The NBNN Kernel," IEEE International Conference on Computer Vision, Nov. 2011.
Wang, et al., "The Effectiveness of Data Augmentation in Image Classification Using Deep Learning," 2017.
Wei, et al., "HCP: A Flexible CNN Framework for Multi-Label Image," IEEE Transactions on Pattern Analysis and Machine Intelligence, Sep. 2016, vol. 38, No. 9, pp. 1907-1907.
Wong, et al., "Understanding Data Augmentation for Classification: When to Warp?" IEEE International Conference on Digital Image Computing: Techniques and Applications, 2016, pp. 1-6.
Wu, et al., "MI-MG Multi-label Learning with Missing Labels Using a Mixed Graph," Proceedings of the IEEE International Conference on Computer Vision, 2015, pp. 4157-4165.
Wu, et al., "Verb Semantics and Lexical Selection," Jun. 1994.
Wu, et al., "Hierarchical Loss for Classification," 2017.
Xie, et al., "DisturbLabel: Regularizing CNN on the Loss Layer," Proceedings of the IEEE Conference on Computer Vision and Pattern Recognition, 2016, pp. 4753-4762.
Xu, et al., "Improved Relation Classification by Deep Recurrent Neural Networks with Data Augmentation," Oct. 2016.
International Search Report and Written Opinion from PCT/US2019/028570, Sep. 11, 2019.

(56) References Cited

OTHER PUBLICATIONS

Liu, et al., "Active contour driven by region-scalable fitting and Kullback-Leibler divergence for image segmentation," Journal of Harbin Institute of Technology, May 2016, vol. 48, No. 5, 9 pages including English language abstract.
Wei, et al., "HCP: A Flexible CNN Framework for Multi-Label Image Classification," IEEE Transactions on Pattern Analysis and Machine Intelligence, 2015, 8 pages.
Chinese Office Action from Chinese Patent Application No. 201980027189.4, dated Mar. 20, 2024, 14 pages including machine-generated English language translation.
Chinese Office Action from Chinese Patent Application No. 201980027189.4, dated Sep. 27, 2024, 11 pages including English language translation.
Chinese Office Action from Chinese Patent Application No. 201980027189.4, dated Jan. 1, 2025, 11 pages with English language translation.
Apple Inc., R2-1817467, 3GPP TSG-RAN WG2 Meeting #104, Nov. 16, 2018, 3 pages.

\* cited by examiner

IMAGE CLASSIFICATION THROUGH LABEL PROGRESSION

This application is a divisional of U.S. patent application Ser. No. 17/308,032, entitled "Image Classification Through Label Progression," filed on May 4, 2021, which is a continuation of U.S. patent application Ser. No. 16/386,151, entitled "Image Classification through Label Progression," filed on Apr. 16, 2019, which claims the benefit of U.S. Provisional Patent Application No. 62/660,901, entitled "Label Refinery: Improving ImageNet Classification through Label Progression," filed on Apr. 20, 2018, each of which is incorporated herein by reference in its entirety for all purposes.

PRIORITY

This application claims the benefit, under 35 U.S.C. § 119(e), of U.S. Provisional Patent Application No. 62/660, 901, filed 20 Apr. 2018, which is incorporated herein by reference.

TECHNICAL FIELD

This disclosure generally relates to data analysis, and in particular relates to image analysis using machine-learning algorithms.

BACKGROUND

Machine learning (ML) is the study of algorithms and mathematical models that computer systems use to progressively improve their performance on a specific task. Machine learning algorithms build a mathematical model of sample data, known as "training data", in order to make predictions or decisions without being explicitly programmed to perform the task. Machine learning algorithms may be used in applications such as email filtering, detection of network intruders, and computer vision, where it is difficult to develop an algorithm of specific instructions for performing the task. Machine learning is closely related to computational statistics, which focuses on making predictions using computers. The study of mathematical optimization delivers methods, theory, and application domains to the field of machine learning. Data mining is a field of study within machine learning and focuses on exploratory data analysis through unsupervised learning. In its application across business problems, machine learning is also referred to as predictive analytics.

Classification between objects is easy task for humans, but it has proved to be a complex problem for machines. The rise of high-capacity computers, the availability of high quality and low-priced cameras, and the increasing need for automatic image analysis has generated strong interest in object classification algorithms. A simple classification system consists of a camera fixed high above the zone of interest, where images are captured and consequently processed. The classification process may include image sensors, image preprocessing, object detection, object segmentation, feature extraction, and object classification. A classification system may include a database that contains predefined patterns to be compared with a detected object in order to classify it into a proper category. Image classification is an important and challenging task in various application domains, including biomedical imaging, biometry, video surveillance, vehicle navigation, industrial visual inspection, robot navigation, and remote sensing.

Among the three main components (data, labels, and models) of any supervised learning system, data and models have been the main subjects of active research. However, studying labels and their properties has received very little attention. Current principles and paradigms of labeling impose several challenges to machine learning algorithms. Labels are often incomplete, ambiguous, and redundant.

SUMMARY OF PARTICULAR EMBODIMENTS

The embodiments disclosed herein study the effects of various properties of labels and introduce a label refining process: an iterative procedure that updates ground truth labels after examining a dataset. The embodiments disclosed herein show significant gain using refined labels across a wide range of models. Although this disclosure describes refining particular labels in particular manners, this disclosure contemplates refining any suitable label in any suitable manner.

In particular embodiments, the computing system may generate a set of crops of images from a corpus of images. The computing system may then apply a first neural network to the set of crops to obtain a set of respective outputs. In particular embodiments, the computing system may then train a second neural network using the set of crops as training examples and using the set of respective outputs as labels for the set of crops. The computing system may further store or transmit the second neural network.

In particular embodiments, the computing system may apply a neural network to a set of data from a corpus of images to obtain a set of respective outputs. The computing system may then train the neural network using the set of data as training examples and using the set of respective outputs as labels for the set of data. In particular embodiments, the computing system may further store or transmit the neural network.

In particular embodiments, the computing system may apply a first neural network to a set of data from a corpus of images to obtain a set of respective outputs. The computing system may then train a second neural network using the set of data as training examples and using the set of respective outputs as labels for the set of data. The second neural network may be not a subnetwork of the first neural network. In particular embodiments, the computing system may further store or transmit the second neural network.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

DESCRIPTION OF EXAMPLE EMBODIMENTS

Improving Image Classification through Label Progression

Figure 1A:
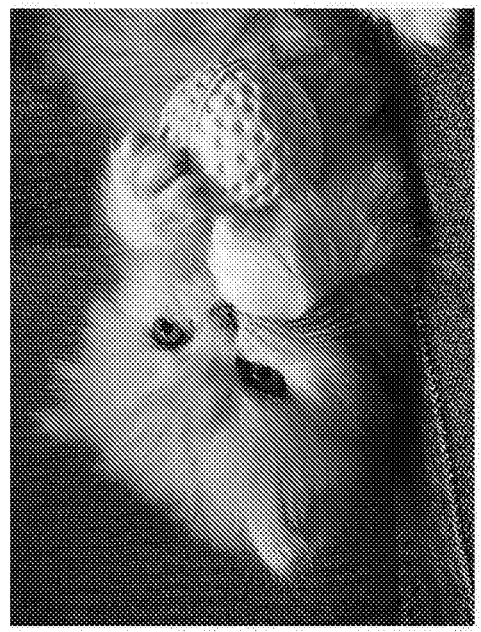
FIG. 1A illustrates an example from ImageNet that is labeled "cat" but the image contains a "ball" as well.

In particular embodiment, a computing system may classify images. Among the three main components (data, labels, and models) of any supervised learning system, data and models have been the main subjects of active research. However, studying labels and their properties has received very little attention. Current principles and paradigms of labeling impose several challenges to machine learning algorithms. Labels are often incomplete, ambiguous, and redundant. The embodiments disclosed herein study the effects of various properties of labels and introduce the Label Refinery: an iterative procedure that updates the ground truth labels after examining the entire dataset. The embodiments disclosed herein show significant gain using refined labels across a wide range of models. Using a Label Refinery may improve the state-of-the-art top-1 accuracy of (I) AlexNet (i.e., a conventional work) from 59.3 to 67.2, (2) MobileNetl (i.e., a conventional work) from 70.6 to 73.39, (3) MobileNet0.25 (i.e., a conventional work) from 50.6 to 55.59, (4) VGG19 (i.e., a conventional work) from 72.7 to 75.46, and (5) Darknetl9 (i.e., a conventional work) from 72.9 to 74.47. Although this disclosure describes refining particular labels in particular manners, this disclosure contemplates refining any suitable label in any suitable manner.

In particular embodiments, the computing system may generate a set of crops of images from a corpus of images. The computing system may then apply a first neural network to the set of crops to obtain a set of respective outputs. In particular embodiments, the computing system may then train a second neural network using the set of crops as training examples and using the set of respective outputs as labels for the set of crops. The computing system may further store or transmit the second neural network.

In particular embodiments, the computing system may apply a neural network to a set of data from a corpus of images to obtain a set of respective outputs. The computing system may then train the neural network using the set of data as training examples and using the set of respective outputs as labels for the set of data. In particular embodiments, the computing system may further store or transmit the neural network.

In particular embodiments, the computing system may apply a first neural network to a set of data from a corpus of images to obtain a set of respective outputs. The computing system may then train a second neural network using the set of data as training examples and using the set of respective outputs as labels for the set of data. The second neural network may be not a subnetwork of the first neural network. In particular embodiments, the computing system may further store or transmit the second neural network.

There are three main components in the typical pipeline of supervised learning systems: the data, the model, and the labels. Sources of data have expanded drastically in past several years. The impact of large-scale datasets has been observed for several visual tasks. A variety of data augmentation methods have effectively expanded these datasets and improved the performance of learning systems. Models have also been extensively studied in the literature. Recognition systems have shown improvements by increasing the depth of the architectures, introducing new activation and normalization layers, and developing optimization techniques and loss functions. In contrast to the improvements in data and models, little effort has focused on improving labels.

Figure 1B:
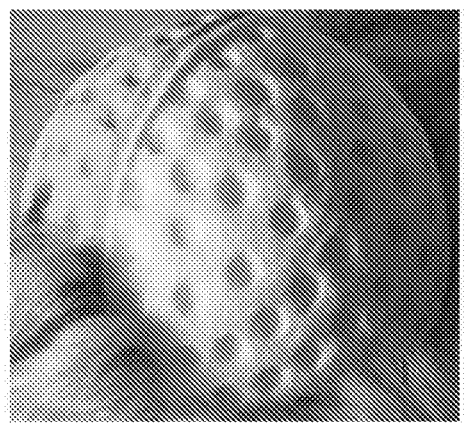
FIG. 1B illustrates an example crop of the original image where the "persian cat" is no longer in the crop.

Current labeling principles and practices impose specific challenges on learning algorithms. 1) Incompleteness: A natural image of a particular category may contain other object categories as well. The standard technique to train modem state-of-the-art architectures is to crop patches as small as 8% area of the original image, and label them with the original image's label. This will often result in inaccurate labels for the augmented data. FIG. 1A illustrates an example from ImageNet that is labeled "cat" but the image contains a "ball" as well. ImageNet is a public image dataset. This problem is rooted in the nature of how researchers define and collect labels and is not unique to a specific dataset. FIG. 1B illustrates an example crop of the original image where the "persian cat" is no longer in the crop. A trained ResNet-50 labels FIG. 1A by "persian cat" and labels FIG. 1B by "golf ball". It may be claimed that using a model to generate levels for the patches results in more accurate labels and therefore more accurate models. 2) Taxonomy Dependency: Categories that are far from each other in the taxonomy structure may be very similar visually. 3) Inconsistency: To prevent overfitting, various loss functions and regularization techniques have been introduced into the training process. Data augmentation is one of the most effective methods employed to prevent neural networks from memorizing the training data. Most modern state-of-the-art architectures for image classification are trained with crop-level data augmentation, in which crops of the image used for training may be as small as 8% of the area of the original image. For many categories, such small crops will frequently result in patches in which the object of interest is no longer visible (FIGS. 1A-1B), resulting in an inconsistency with the original label.

To address the aforementioned shortcomings, the embodiments disclosed herein argue that several characteristics should apply to ideal labels. Labels should be soft to provide more coverage for co-occurring and visually-related objects. Traditional one-hot vector labels introduce challenges in the modeling stage. Labels should be informative of the specific image, meaning that they may not be identical for all the images in a given class. For example, an image of a "dog" that has similar appearance to a "cat" should have a different label than an image of a "dog" that has similar appearance to a "fox". This also suggest that labels should be defined at the instance-level rather than the category-level. Determining the best label for each instance may require observing the entire data to establish intra- and inter-category relations, suggesting that labels should be collective across the whole dataset. Labels should also be consistent with the image content when crops are taken. Therefore, labels should be dynamic in the sense that the label for a crop should depend on the content of the crop.

Figure 2:
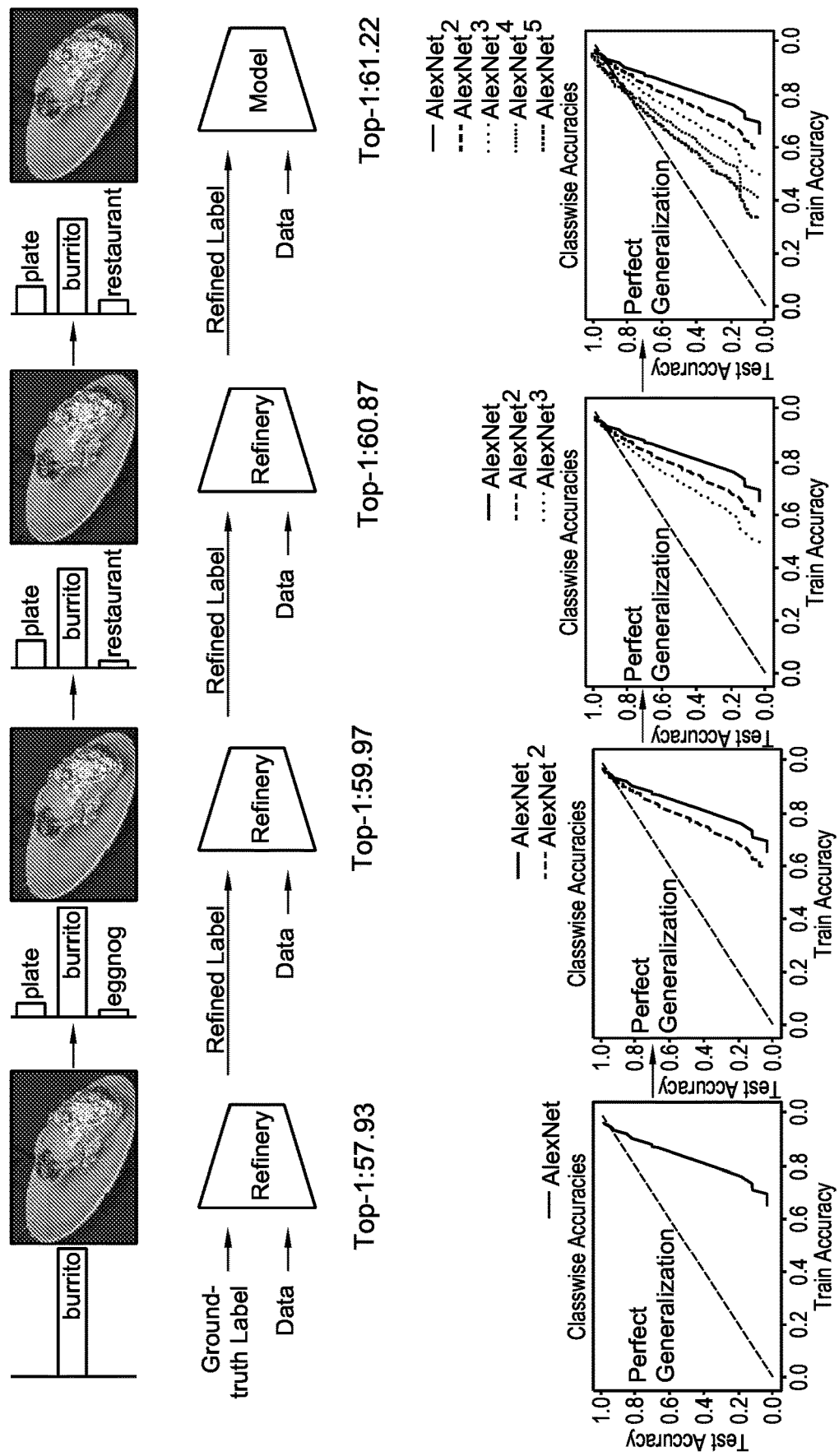
FIG. 2 illustrates an example of a label refinery.

The embodiments disclosed herein introduce Label Refinery, a solution that uses a neural network model and the data to modify crop labels during training. Refining the labels while training may enable the generation of soft, informative, collective, and dynamic labels. FIG. 2 illustrates an example of a label refinery. Current labeling principles impose challenges for machine learning models. Therefore, the embodiments disclosed herein introduce the Label Refinery, which is an iterative procedure to update ground truth labels using a visual model trained on the entire dataset. The Label Refinery produces soft, multi-category, dynamically-generated labels consistent with the visual signal. In FIG. 2, the training image shown is labelled with the single category "burrito". After a few iterations of label refining, the labels from which the final model is trained are informative, unambiguous, and smooth. This results in major improvements in the model accuracy during successive stages of refinement as well as improved model generalization. These plots in FIG. 2 show that as models proceed through successive stages of refinement, the gaps between train and test results and approach ideal generalization. As models go through the stages of the refinery labels are updated based on the previous models. This results in major improvements in the accuracy and generalization. The output of the label refinery is a set of labels from which one may be able to train a model. The model trained from the produced labels are much more accurate and more robust to overfitting.

The experiments in the embodiments disclosed herein show that Label Refining may consistently improve the accuracy of object classification networks by a large margin across a variety of popular network architectures. The improvements in Top-1 accuracy on the ImageNet validation set include: AlexNet (i.e., a conventional work) from 59.3% to 67.2%, VGG19 (i.e., a conventional work) from 72.7% to 75.46%, ResNet18 (i.e., a conventional work) from 69.57% to 72.52%, ResNet50 (i.e., a conventional work) from 75.7% to 76.5%, DarkNet19 (i.e., a conventional work) from 72.9% to 74.47%, MobileNeto.2s (i.e., a conventional work) from 50.65% to 55.59%, and MobileNet1 (i.e., a conventional work) from 70.6% to 73.39%. Collective and dynamic labels enable standard models to generalize better, resulting in significant improvements in image classification. FIG. 2 plots the train versus test accuracies as models go through the label refinery procedure. The gap between train and test accuracies is getting smaller and closer to an ideal generalization.

The embodiments disclosed herein further demonstrate that a trained model may be able to serve as a Label Refinery for another model of the same architecture. For example, the embodiments disclosed herein iterate through several successions of training a new AlexNet model by using the previously trained AlexNet model as a Label Refiner. The results show major improvements (from 59.3% to 61.2%) on using AlexNet to refine labels for another AlexNet. Note that the final AlexNet has not seen the actual groundtruth labels in the past few stages. The final AlexNet models demonstrate greatly reduced overfitting compared to the original models. The embodiments disclosed herein also experiment with using a model of one architecture as a Label Refiner for a model of another architecture. Further, the embodiments disclosed herein have also shown that adversarially modifying image examples may improve the accuracy when using label refinery.

The contributions of the embodiments disclosed herein may include: (1) introducing the Label Refinery for crop-level label augmentation, (2) improving state-of-the-art accuracy on ImageNet for a variety of existing architectures, (3) demonstrating the ability of a network to improve accuracy by training from labels generated by another network of the same architecture, and (4) generating adversarial examples to improve the performance of the Label Refinery method.

Label Smoothing and Regularization: Softening labels has been used to improve generalization. A conventional work uniformly redistributes 10% of the weight from the ground-truth label to other classes to help regularize during training. Disturb Label (i.e., a conventional work) replaces some of the labels in a training batch with random labels. This helps regularize training by preventing overfitting to ground-truth labels. Another conventional work augments noisy labels using other models to improve label consistency. Another conventional work introduces a notion of local distributional smoothness in model outputs based on the smoothness of the model's outputs when inputs are perturbed. The smoothness criterion is enforced with the purpose of regularizing models. Another conventional work explores penalizing networks by regularizing the entropy of the model outputs. Unlike embodiments described herein, these approaches may not address the inconsistency of the labels.

Incorporating Taxonomy: Several methods have explored using taxonomy to improve label and model quality. A conventional work uses cross-category relationships from knowledge graphs to mitigate the issues caused by noisy labels. Another conventional work designs a hierarchical loss to reduce the penalty for predictions that are close in taxonomy to the ground-truth. Another conventional work investigates learning multi-label classification with missing labels. They incorporate instance-level information as well as semantic hierarchies in their solution. Incorporating taxonomic information directly into the model's architecture is explored in another conventional work. Another conventional work uses the output of existing binary classifiers to address the problem of training models on single-label examples that contain multiple training categories. These methods fail to address the incompleteness of the labels. Instead of directly using taxonomy, the model disclosed herein collectively infers the visual relations between categories to impose such knowledge into the training while capturing a complete description of the image.

Data Augmentation: To preserve generalization, several data augmentations such as croppmg, rotating, and flipping input images have been applied in training models. A conventional work proposes data warping and synthetic over-sampling to generate additional training data. Another two conventional works explore using GANs to generate training examples.

Most of such augmentation techniques further confuse the model with inconsistent labels. For example, a random crop of an image might not contain the main object the that image. The embodiments disclosed herein propose augmenting the labels alongside with the data by refining them during training when augmenting the data.

Teacher-Student Training: Using another network or an ensemble of multiple networks as a teacher model to train a student model has been explored in several conventional works. A conventional work explores training a shallow student network from a deeper teacher network. A teacher model is used in another two conventional works to train a compressed student network. Most similar to the embodiments disclosed herein is a conventional work where they introduce distillation loss for training a model from an ensemble of its own. The embodiments disclosed herein show that Label Refinery is ideally done at the crop level, it benefits from being performed iteratively, and models benefit by learning off of the labels generated by the exact same model.

Figure 3B:
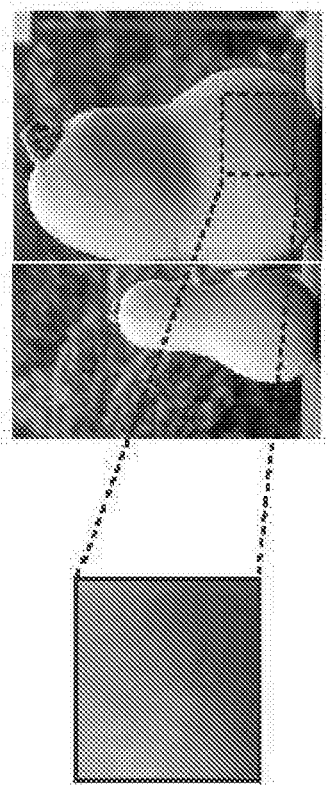
FIG. 3B illustrates a training example from "buttemutsquash" category of ImageNet.
Figure 3A:
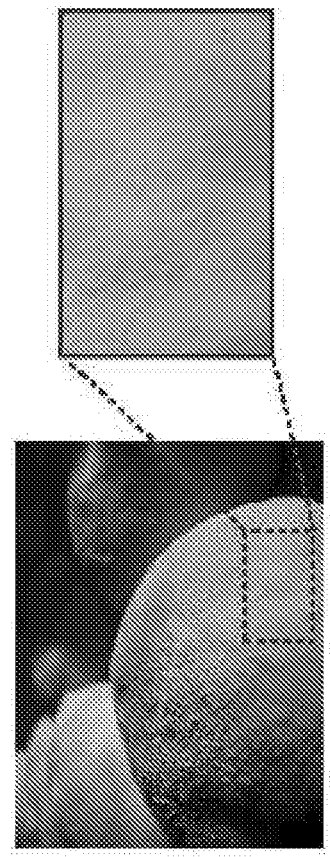
FIG. 3A illustrates a training example from "dough" category of ImageNet.

Previous works have shown that data augmentation using cropping significantly may improve the performance of classification models. In particular embodiments, the computing system may generate a set of crops of images from a corpus of images. Given a dataset $D=\{(Xi, Yi)\}$, data augmentation may be formalized by defining a new dataset $l5=\{(f(Xi), Yi)\}$, where f is a stochastic function that generates crops on-the-fly for the image Xi. FIG. 3A illustrates a training example from "dough" category of ImageNet. FIG. 3B illustrates a training example from "buttemutsquash" category of ImageNet. While the two sample images are visually distinctive, their random crops are quite similar. A trained ResNet-50 model may label both cropped patches softly over categories of "dough", "buttemutsquash", "burrito", "frenchloaf", and "spaghettisquash". The image labels assigned to the augmented crops are often not accurate (FIGS. 1A-1B and FIGS. 3A-3B). It may be claimed that labelling the crops softly by a trained model makes the training of the same model more stable, and therefore results in more accurate models. The embodiments disclosed herein address this problem by passing the dataset through multiple Label Refiners. The first Label Refinery network $c_{02}$ is trained over the dataset l5 with the inaccurate crop labels. The first Label Refinery network $c_{02}$ may be denoted as a first neural network. The second Label Refinery network $C_2$ is trained over the same set of images, but uses labels generated by $C_{01}$-. The second Label Refinery network $C_2$ may be denoted as a second neural network. More formally, this procedure may be viewed as training $C_{02}$ on a new augmented dataset $D1=\{(f(Xi), C_0/f(Xi)))\}$. Once $C_{02}$ is trained, it may be similarly used to train a subsequent network $C_{03}$. In particular embodiments, the second neural network may be not a subnetwork of the first neural network. To be more specific, the first neural network and the second neural network may lack layers that are common to the first neural network and the second neural network.

The first Label Refinery network $C_{01}$ is trained using the cross-entropy loss against the image-level ground-truth labels. Subsequent Label Refinery models $C_0t$, for t>1 may be trained by minimizing the Kullback-Leibler (KL)-divergence between its output and the soft label generated by the previous Label Refinery $C_{0t-i}$, Letting ptc(z) $C_0$/z)[c] be the probability assigned to class c in the output of model $C_0t$, on some crop z, the loss function for training model Cc, is (as shown below in Equation 1):

$$Lc(f(Xi)) = -LeP\,{-}^1\left(f(xa)\log\right. \quad (1)$$
$$\left.(P{:}i)\right) = -LeP\,{-}^1\,(fcxa)\log p(fcxa) + Lep\,{-}^1\,(f(Xi))\log p\,{-}^1\,(fcxa)$$

The second term is the entropy of the soft labels and is constant with respect to $C_{01}$. It may be removed, and the cross-entropy loss may be instead minimized (as shown below in Equation 2):

$$\tilde{L}_t(f(X_i))=-\Sigma_c p_c^{\,t-1}(f(X_i))\log p_c^{\,t}(X_i)) \quad (2)$$

Note that training $C_{01}$ using cross entropy loss may be viewed as a special case of the sequential training method using KL-divergence in which $C_{01}$ is trained from the original image-level labels. It's worth emphasizing that the subsequent models do not see the original ground truth labels Yi. The information in the original labels is propagated by the sequence of Label Refinery networks.

If any of the Label Refinery networks have Batch Normalization (i.e., a conventional work), they are put in training mode even at the label generation step. That is, their effective mean and standard deviation to be computed from the current training batch as opposed to the saved running mean and running variance. It has been observed that this results in more accurate labels and, therefore, more accurate models. It is believed that this may be due to the fact that the Label Refinery has been trained with the Batch Normalization layers in the training mode. Hence it produces more accurate labels for the training set if it's in the same mode.

It is possible to use the same network architecture for some (or all) of the Label Refinery networks in the sequence. In other words, the first neural network may be the second neural network. It has been empirically observed that the dataset labels improve iteratively even when the same network architecture is used multiple times. This may be because the same Label Refinery network trained on the new refined dataset becomes more accurate that its previous versions over each pass. Thus, subsequent networks are trained with more accurate labels.

The accuracy of a trained model heavily depends on the consistency of the labels provided to it during training. Unfortunately, assessing the quality of crop labels quantitatively is not possible because there crop level labels are not provided. Asking human annotators to evaluate individual crops is infeasible both due to the number of possible crops and due to the difficulty of evaluating soft labels to a large number of categories for a crop in which there may not be a single main object. A network's validation set accuracy may be used as a measure of its ability to produce correct labels for crops. Intuitively, this measurement serves as an indication of the quality of a Label Refinery network. However, it is observed that models with higher validation accuracy do not always produce better crop labels if the model with higher validation accuracy is severely overfit to the training set. Intuitively, this may be because the model will reproduce the ground-truth image labels for training set images.

One popular way to augment ImageNet data is to crop patches as small as 8% of the area of the image. In the presence of such aggressive data augmentation, the original image label is often very inaccurate for the given crop. Whereas traditional methods only augment the image input data through cropping, the embodiments disclosed herein additionally augment the labels using Label Refinery networks to produce labels for the crops. Smaller networks such as MobileNet usually aren't trained with such small crops. Yet, it is observed that such networks may be able to benefit from small crops if a Label Refinery is used. This demonstrates that a primary cause in accuracy degradation of such networks is inaccurate labels on small crops.

Using a Label Refinery network allows generating labels for any set of images. The training dataset $I5=\{(j(X_i),C_0/f(X_i)))\}$ depends only on the input images $X_i$, and labels are generated on-the-fly by the Refinery network $C_{01}$. This means that one is no longer limited to using images in the training set D. Another unlabeled image dataset could be used as a source of $X_i$. One could even use synthetic images. In other words, the computing system may apply the neural network to a second set of data from the corpus of images to obtain a second set of respective outputs and train the neural network using the second set of data as training examples and using the second set of respective outputs as labels for the second set of data. The embodiments disclosed herein experiment with using the Label Refinery in conjunction with the network being trained in order to generate adversarial examples on which the two networks disagree. In other words, generating the set of crops of images from the corpus of images may comprise applying adversarial jittering to a crop of an image from the corpus of images to obtain an adversarial crop that is included in the set of crops.

In particular embodiments, applying adversarial jittering to the crop may comprise applying one or more steps of gradient ascent to the crop based on a Kullback-Leibler divergence loss function. Let $C_{0t-i}$ and $C_{01}$ be two of the networks in a sequence of Label Refinery networks. Given a cropf(Xi), alf(Xi)) is defined to be a modification off(Xi) for which $C_{0t-i}$ and $C_{01}$ output different probability distributions. Following the practice of a conventional work for generating adversarial examples, at is defined as (as shown below in Equation 3):

$$ac(X) = X + 1 J_a \frac{lt}{a\, x} \quad (3)$$

where Lt is the KL-divergence loss defined in Equation (1). This update performs one step of gradient ascent in the direction of increasing the KL-divergence loss. In other words, the input is modified to exacerbate the discrepancy between the output probability distributions. In order to prevent the model being trained from becoming confused by the unnatural inputs alf(Xi)), the adversarial examples are batched with their corresponding natural cropsf(Xi).

The embodiments disclosed herein evaluate the effect of label refining for a variety of network architectures on the standard ImageNet, ILSRVC2012 classification challenge. The embodiments disclosed herein first explore the effect of label refining when the Label Refinery network architecture is identical to the architecture of the network being trained. The embodiments disclosed herein then evaluate the effect of label refining when the Label Refinery uses a more accurate network architecture. Finally, the embodiments disclosed herein present some ablation studies and analysis to investigate the source of the improvements. Note that all experiments described herein were done with a single model over a single validation crop.

Implementation Details: In particular embodiments, models may be trained using PyTorch (i.e., an open-source machine learning library for Python) on 4 GPUs for 200 epochs to ensure convergence. The learning rate is constant for the first 140 epochs. It is divided by 10 after epoch 140 and again divided by 10 after epoch 170. The embodiments disclosed herein use an initial learning rate of 0.01 to train AlexNet and an initial learning rate of 0.1 for all other networks. The embodiments disclosed herein use image cropping and horizontal flipping to augment the training set. When cropping, the embodiments disclosed herein follow the data augmentation practice of a conventional work in which the crop areas are chosen uniformly from 8% to 100% of the area of the image. The embodiments disclosed herein use a batch size of 256 for all models except the MobileNet variations, for which the embodiments disclosed herein use batch size of 512. Except for adversarial inputs experiments, the embodiments disclosed herein train models from refined labels starting from a random initialization.

Self-Refinement: The embodiments disclosed herein first explore using a Label Refinery to train another network with the same architecture. Table 1 shows the results for self-refinement on AlexNet, ResNet-50, and MobileNet architectures. Each model is trained using labels refined by the model right above it. That is, Alex $Net^3$ is trained by the labels refined by $AlexNet^2$, and $AlexNet^2$ is trained by the labels refined by AlexNet. The first-row models are trained using the image level ground-truth labels. Each row represents a randomly-initialized instance of the network architecture trained with labels refined by the model directly one row above it in the table. All three network architectures improve their accuracy through self-refinement. For AlexNet the self-refining process is repeated four times before convergence, whereas MobileNet and ResNet-50 converge much faster. The embodiments disclosed herein argue that this is because AlexNet is more overfit to the training set. Therefore, it takes a more training iterations to forget the information that it has memorized from training examples. One might argue that this is due to the extended training time of models. However, the embodiments disclosed herein experimented with training models for an equal number of total epochs and the model accuracies did not improve further.

TABLE 1

Self-refining results on the ImageNet 2012 validation set.

| Model | Top-1 | Top-5 |
|---|---|---|
| AlexNet | 57:93 | 79:41 |
| $AlexNet^2$ | 59:97 | 81:44 |
| $AlexNet^3$ | 60:87 | 82:13 |
| $AlexNet^4$ | 61:22 | 82:56 |

TABLE 1-continued

Self-refining results on the ImageNet 2012 validation set.

| Model | Top-1 | Top-5 |
|---|---|---|
| AlexNet[5] | 61:37 | 82:56 |
| ResNet50 | 75:7 | 92:81 |
| ResNet50[2] | 76:5 | 93:12 |
| MobileNet | 68:51 | 88:13 |
| MobileNet[2] | 69:52 | 88:7 |

Cross-Architecture Refinement: The architecture of a Label Refinery network may be different from that of the trained network. A high-quality Label Refinery should not overfit on training data even if its validation accuracy is high. In other words, under the same validation accuracy, a network with lower training accuracy is a better Label Refinery. Intuitively, this property may allow the refinery to generate high-quality crop labels that are reflective of the true content of the crops. This property prevents the refinery from simply predicting the training labels. It is observed that a ResNet-50 model trained to 75.7% top-1 validation accuracy on ImageNet may be able to serve as a high-quality refinery. Table 2 shows that a variety of network architectures benefit significantly from training with refined labels. The Label Refinery used in these experiments is a ResNet-50 model trained with weight decay. tThese models may be further improved by training with adversarial inputs (Table 3). All network architectures that were tried using Label Refineries gained significant accuracy improvement over their previous state-of-the-art. AlexNet and ResNetXnor-50 (i.e., the XNOR-net 32 version of ResNet-50 in which layers are binary) achieve more than a 7-point improvement in top-1 accuracy. Efficient and compact models such as MobileNet benefit significantly from cross-architecture refinement. VGG networks have a very high capacity and they overfit to the training set more than the other networks. Providing more accurate training set labels helps them to fit to more accurate signals and perform better at validation time. Darknet19, the backbone architecture of YOLOv2 33, may improve almost 4 points when trained with refined labels.

TABLE 2

Using refined labels may improve the accuracy of a variety of network architectures to new state-of-the-art accuracies.

| | Paper Number | | Our Impl. | | Label Refinery | |
|---|---|---|---|---|---|---|
| Model | Top-1 | Top-5 | Top-1 | Top-5 | Top-1 | Top-5 |
| AlexNet | 59.3 | 81.8 | 57.93 | 79.41 | 66.28t | 86.13t |
| MobileNet | 70.6 | NIA | 68.53 | 88.14 | 73.39 | 91.07 |
| MobileNet0.75 | 68.4 | NIA | 65.93 | 86.28 | 70.92 | 89.68 |
| MobileNet0.5 | 63.7 | NIA | 63.03 | 84.55 | 66.66t | 87.07t |
| MobileNet0.25 | 50.6 | NIA | 50.65 | 74.42 | 54.62t | 77.92t |
| ResNet-50 | NIA | NIA | 75.7 | 92.81 | 76.5 | 93.12 |
| ResNet-34 | NIA | NIA | 73.39 | 91.32 | 75.06 | 92.35 |
| ResNet-18 | NIA | NIA | 69.7 | 89.26 | 72.52 | 90.73 |
| ResNetXnor-50 | NIA | NIA | 63.1 | 83.61 | 70.34 | 89.18 |
| VGG16 | 73 | 91.2 | 70.1 | 88.54 | 75 | 92.22 |
| VGG19 | 72.7 | 91 | 71.39 | 89.44 | 75.46 | 92.52 |
| Darknet19 | 72.9 | 91.2 | 70.6 | 89.13 | 74.47 | 91.94 |

Adversarial Inputs: As discussed before, one may be able to adversarially augment the training set with patches on which the refinery network and the trained model disagree. The embodiments disclosed herein used a gradient step of n=1, as defined in Equation (3) to augment the dataset. The embodiments disclosed herein batch each adversarially modified crop with the original crop during training. This helps to ensure the trained model does not drift too far from natural images. It is observed in Table 3 that smaller models further improve beyond the improvements from using a Label Refinery alone. The Adversarial Label Refinery is ResNet-50.

TABLE 3

Smaller models are further improved by training over adversarial inputs.

| | GT Labels | | Label Refinery | | Adversarial | |
|---|---|---|---|---|---|---|
| Model | Top-1 | Top-5 | Top-1 | Top-5 | Top-1 | Top-5 |
| AlexNet | 57.93 | 79.41 | 66.28 | 86.13 | 67.2 | 86.92 |
| MobileNet0.5 | 63.03 | 84.55 | 66.66 | 87.07 | 67.33 | 87.4 |
| MobileNet0.25 | 50.65 | 74.42 | 54.62 | 77.92 | 55.59 | 78.58 |

The embodiments disclosed herein explore the characteristics of models trained usmg a Label Refinery. The embodiments disclosed herein first explore how much of the improvement comes from the dynamic labeling of the image crops and how much of it comes from softening the target labels. The embodiments disclosed herein then explore the overfitting characteristics of models trained with a Label Refiner. Finally, the embodiments disclosed herein explore using various loss functions to train models against the refined labels. Most of the analyses are performed on AlexNet architecture because it trains relatively fast (~1 day) on the ImageNet dataset.

Dynamic Labels vs Soft Labels: The benefits of using a label refinery are twofold: (1) Each crop is dynamically relabeled with more accurate labels for the crop (FIGS. 1A-1B), and (2) images are softly labeled according to the distribution of visually similar objects in the crop (FIGS. 3A-3B). It is found that both aspects of the refinement process improve performance. To assess the improvement from dynamic labeling alone, the embodiments disclosed herein perform label refinement with hard dynamic labels. Specifically, the embodiments disclosed herein assign a one-hot label to each crop by passing the crop to the Label Refinery and choosing the most-likely category from the output. To observe the improvement from soft labeling alone, the embodiments disclosed herein perform label refinement with soft static labels. To compute these labels for a given crop, the embodiments disclosed herein pass a center crop of the original image to the refiner rather than using the training crop. The embodiments disclosed herein compare the results for soft static labels and hard dynamic labels in Table 4. When combined the improvement is increased over both, suggesting that they capture different aspects of label errors. Label Refinery is ResNet-50. Both dynamic labeling and soft labeling significantly improve the accuracy of AlexNet. When they are combined, additional improvement may be observed, suggesting that they address different issues with labels in the dataset.

TABLE 4

AlexNet benefits from both soft labeling and dynamic labeling.

| Model | Top-1 | Top-5 |
|---|---|---|
| AlexNet - no refinery | 57.93 | 79.41 |
| AlexNet - soft static refinery | 63.55 | 84.16 |
| AlexNet - hard dynamic refinery | 64.41 | 84.53 |
| AlexNet - soft dynamic refinery | 66.28 | 86.13 |

Category Level Refining vs Image Level Refining: Labels may be refined at the category level. That is, all images in a class may be assigned a unique soft label that models intra-category similarities. At the category level, labels may be refined either by visual cues (based on the visual similarity between the categories) or by semantic relations (based on the taxonomic relationship between the categories). Since ImageNet categories are drawn from WordNet, taxonomy-based distances may be used to refine the labels. The embodiments disclosed herein experiment with using the Wu-Palmer similarity (i.e., a conventional work) of the WordNet (i.e., a lexical database) categories to refine the category labels. Table 5 compares refining labels at the category level with refining at the image level. Note that "AlexNet—visually refined images" is trained over image level refined labels as opposed to crop level. For fairness, the batch normalization layers of label refinery (which harms the quality of label refinery) was fixed in all visually refined labels experiments. Label Refinery is ResNet-50. It is observed larger improvements when the labels are refined at the image level. The experiment shows that taxonomy-based refinement does not improve training. It is believed this may be because WordNet similarities do not correlate well with visual similarities in the image space. Refining category labels based off of their WordNet distance may be able to confuse the target model.

TABLE 5

Comparing refining labels at category level vs. image level.

| Model | Top-1 | Top-5 |
|---|---|---|
| AlexNet - no refinery | 57.93 | 79.41 |
| AlexNet - taxonomy based refined categories | 56.73 | 77.69 |
| AlexNet - visually refined categories | 58.54 | 80.77 |
| AlexNet - visually refined images | 62.69 | 83.46 |

Figures 4A, 4B:
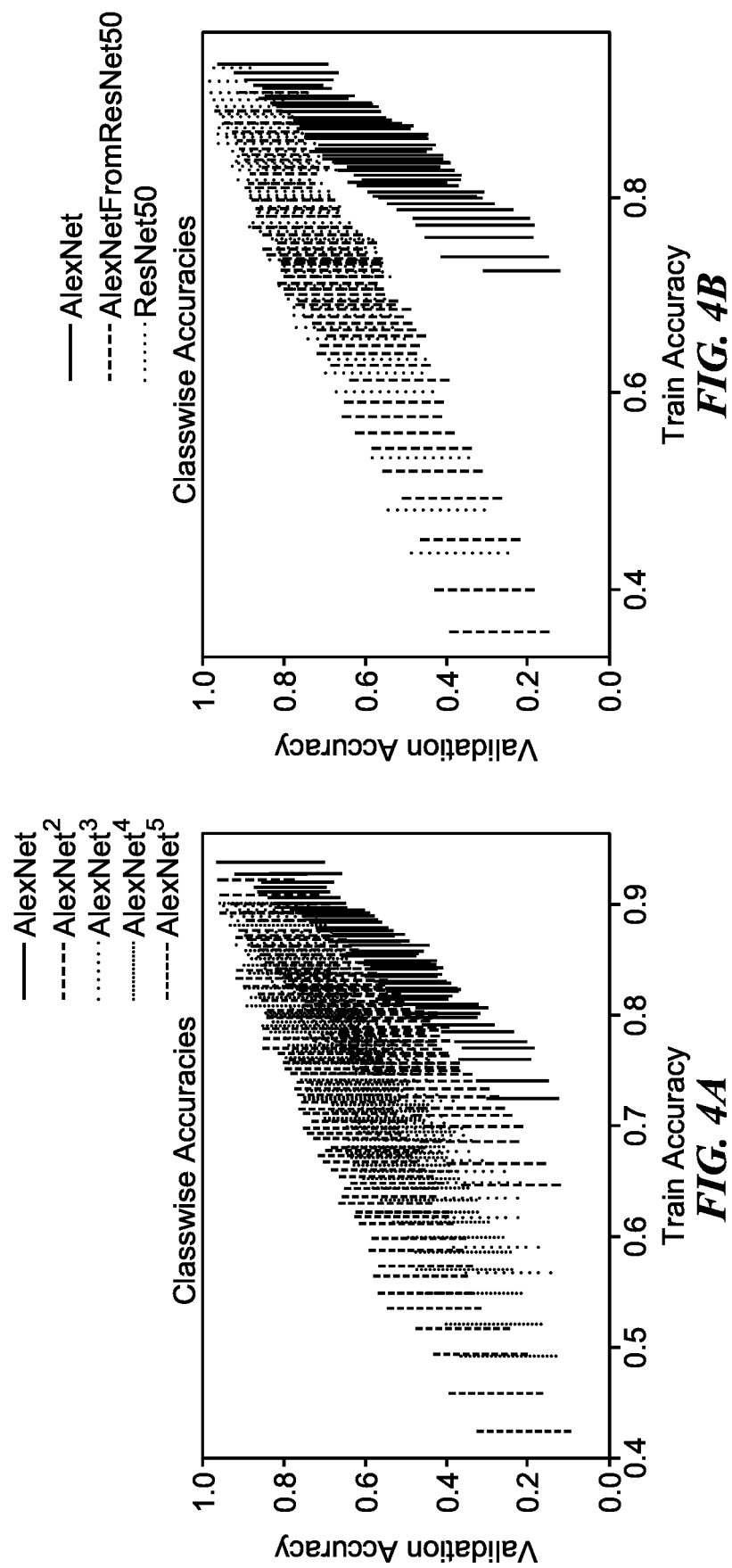
FIG. 4A illustrates example accuracies of a sequence of AlexNet models.
FIG. 4B illustrates example per-category accuracies of AlexNet and ResNet-50, as well as an AlexNet model trained with a ResNet50 Label Refinery.

Model Generalization: FIGS. 4A-4B show the per-category train and validation accuracies of ImageNet categories for models trained with a Label Refinery. For each model, labels were sorted according to training set accuracies and divided into bins. Each point in the plot shows the average validation set accuracy and the associated standard deviation for each bin. These figures show that training with a refinery results in models with less over fitting. FIG. 4A illustrates example accuracies of a sequence of AlexNet models. AlexNet trained using the ground-truth labels has much higher train accuracy. Successive models demonstrate less over-fitting as shown by the decrease in the ratio between train accuracy and validation accuracy. FIG. 4B illustrates example per-category accuracies of AlexNet and ResNet-50, as well as an AlexNet model trained with a ResNet50 Label Refinery. ResNet-50 trained with weight decay generalizes better compared to AlexNet, which has two fully connected layers. Intuitively, the generalization of ResNet-50 enables it to generate accurate per-crop labels for the training set. Thus, training AlexNet with a ResNet-50 Label Refinery allows AlexNet to perform well on the test set without overfitting to the original ground-truth labels.

Figure 5B:
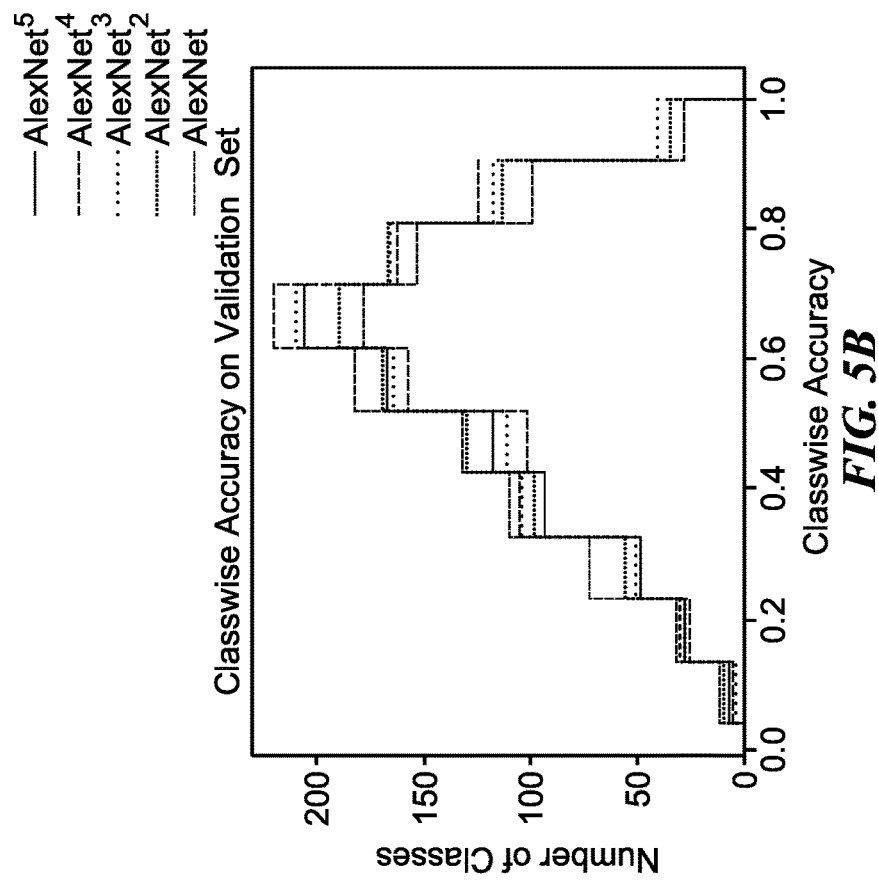
FIG. 5B illustrates example validation set accuracies of a sequence of AlexNet models trained with a Label Refinery.
Figure 5A:
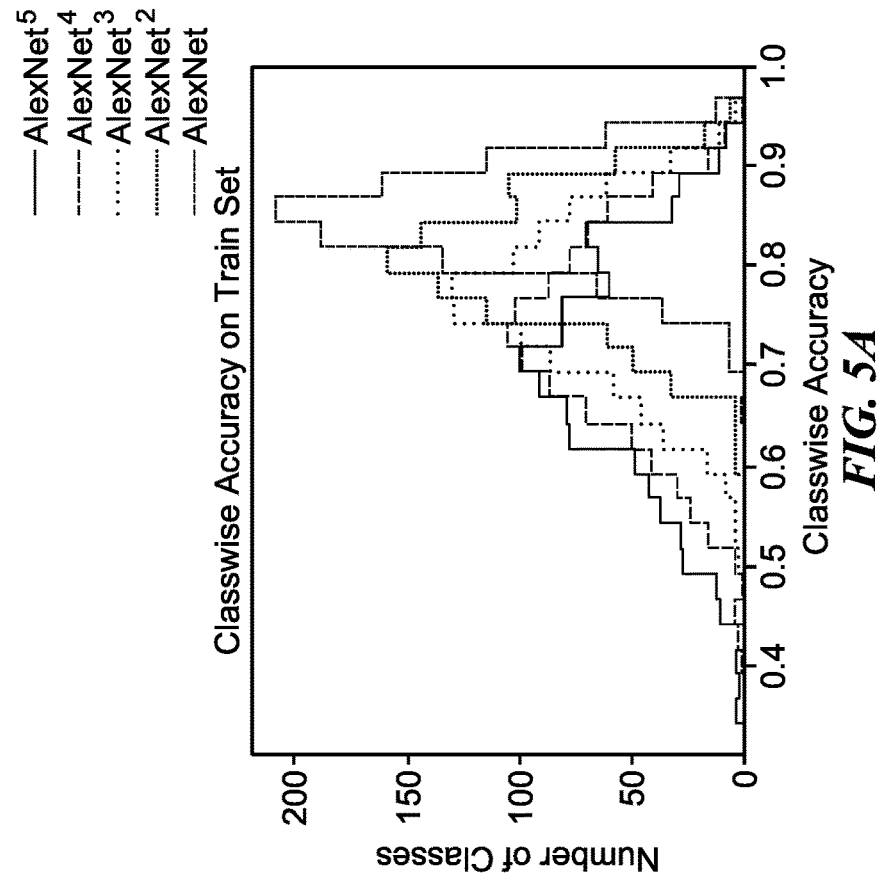
FIG. 5A illustrates example training set accuracies of a sequence of AlexNet models trained with a Label Refinery.
Figures 6A, 6B:
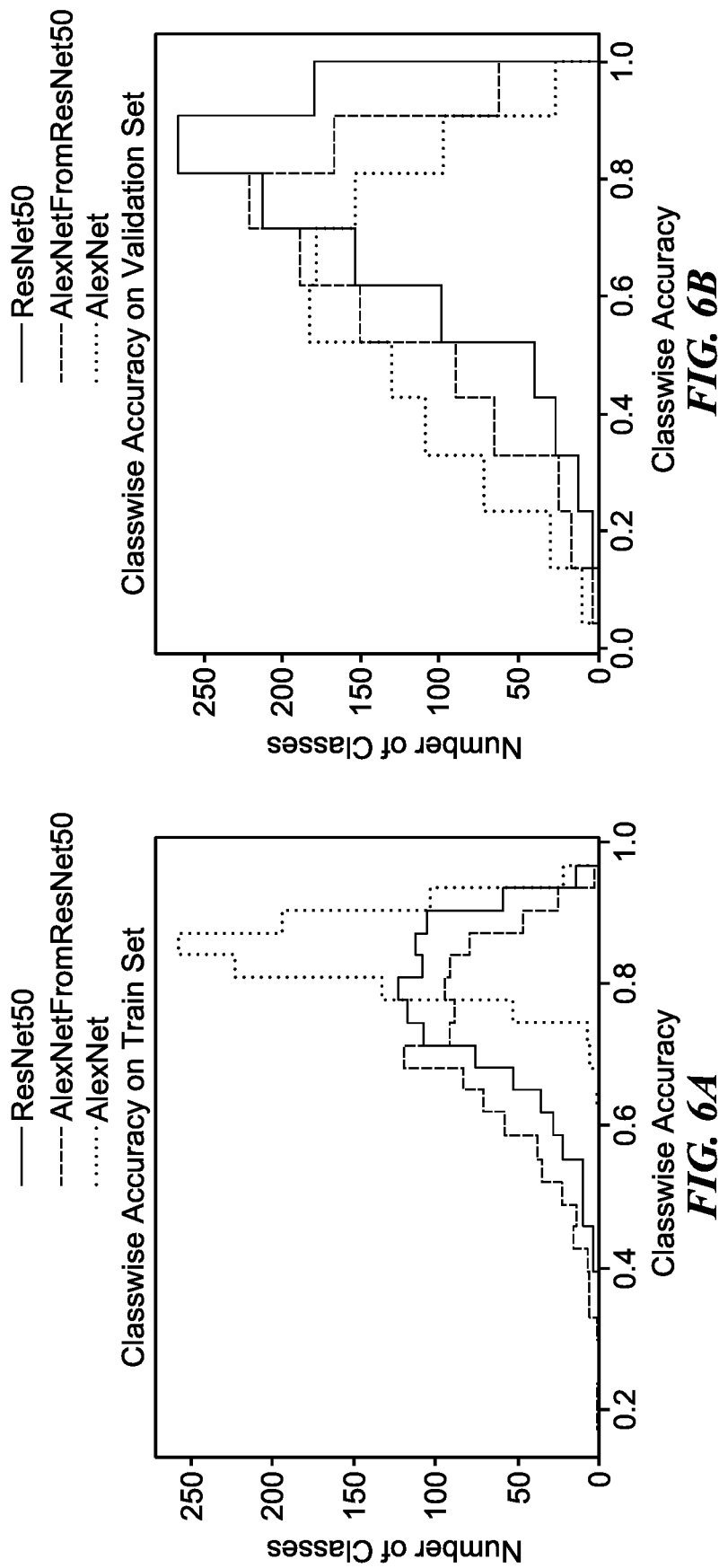
FIG. 6A illustrates example train set accuracies for AlexNet, ResNet, and AlexNet trained off of labels generate by ResNet50.
FIG. 6B illustrates example validation set accuracies for AlexNet, ResNet, and AlexNet trained off of labels generate by ResNet50.

FIG. 5A illustrates example training set accuracies of a sequence of AlexNet models trained with a Label Refinery. FIG. 5B illustrates example validation set accuracies of a sequence of AlexNet models trained with a Label Refinery. FIGS. 5A-5B show the train and validation accuracy distribution of AlexNet models trained sequentially. AlexNet is trained off of the ground-truth labels, and the successive models AlexNeti+l are trained off of the labels generated by AlexNeti. The AlexNet trained with ground-truth labels achieves ~86% training accuracy for the majority of classes, but achieves much lower validation set accuracies. By contrast, AlexNet 5 has a training accuracy profile more closely resembling its validation accuracy profile. FIG. 6A illustrates example train set accuracies for AlexNet, ResNet, and AlexNet trained off of labels generate by ResNet50. FIG. 6B illustrates example validation set accuracies for AlexNet, ResNet, and AlexNet trained off of labels generate by ResNet50. FIGS. 6A-6B show a similar phenomenon training AlexNet with a ResNet-50 refinery. It's interesting to note that the training and validation profiles of AlexNet trained with a ResNet50 Label Refinery more closely resemble the refinery than the original AlexNet.

Choice of Label Refinery Network: A good Label Refinery network should generate accurate labels for the training set crops. A Label Refinery's validation accuracy is an informative signal of its quality. However, if the Label Refinery network is heavily overfitted on the training set, it will not be helpful during training because it will produce the same ground-truth label for all image crops. Table 6 compares different architecture choices for refinery network. VGG16 is a worse choice of Label Refinery than MobileNet, even though VGG16 is more accurate. This is because VGG16 severely overfits to the training set and therefore produces labels too similar to the ground-truth.

TABLE 6

Different architecture choices for the refinery network.

| | Refinery | | AlexNet | |
|---|---|---|---|---|
| Model | Top-1 | Top-5 | Top-1 | Top-5 |
| AlexNet - no refinery | N/A | N/A | 57.93 | 79.41 |
| AlexNet - refinery: VGG16 | 70.1 | 88.54 | 60.78 | 81.80 |
| AlexNet - refinery: MobileNet | 68.53 | 88.14 | 65.22 | 85.69 |
| AlexNet - refinery: ResNet-50 | 75.7 | 92.81 | 66.28 | 86.13 |

Choice of Loss Function: A variety of loss functions may be used to train the target networks to match the soft labels. The KL-divergence loss function that the embodiments disclosed herein use is a generalization of the standard cross-entropy classification loss. Note that KL-divergence is not a symmetric function (i.e. DK L(P||Q) i-DK L(Q||P)). Table 7 shows the model accuracy if other standard loss functions are used. Label Refinery is ResNet-50.

TABLE 7

Different loss function choices.

| Model | Top-1 | Top-5 |
|---|---|---|
| AlexNet - no refinery | 57.93 | 79.41 |
| AlexNet - $l_2$ loss | 63.16 | 85.56 |
| AlexNet - KL-divergence from output to label | 65.36 | 85.41 |
| AlexNet - KL-divergence from label to output | 66.28 | 86.13 |

Figure 7:
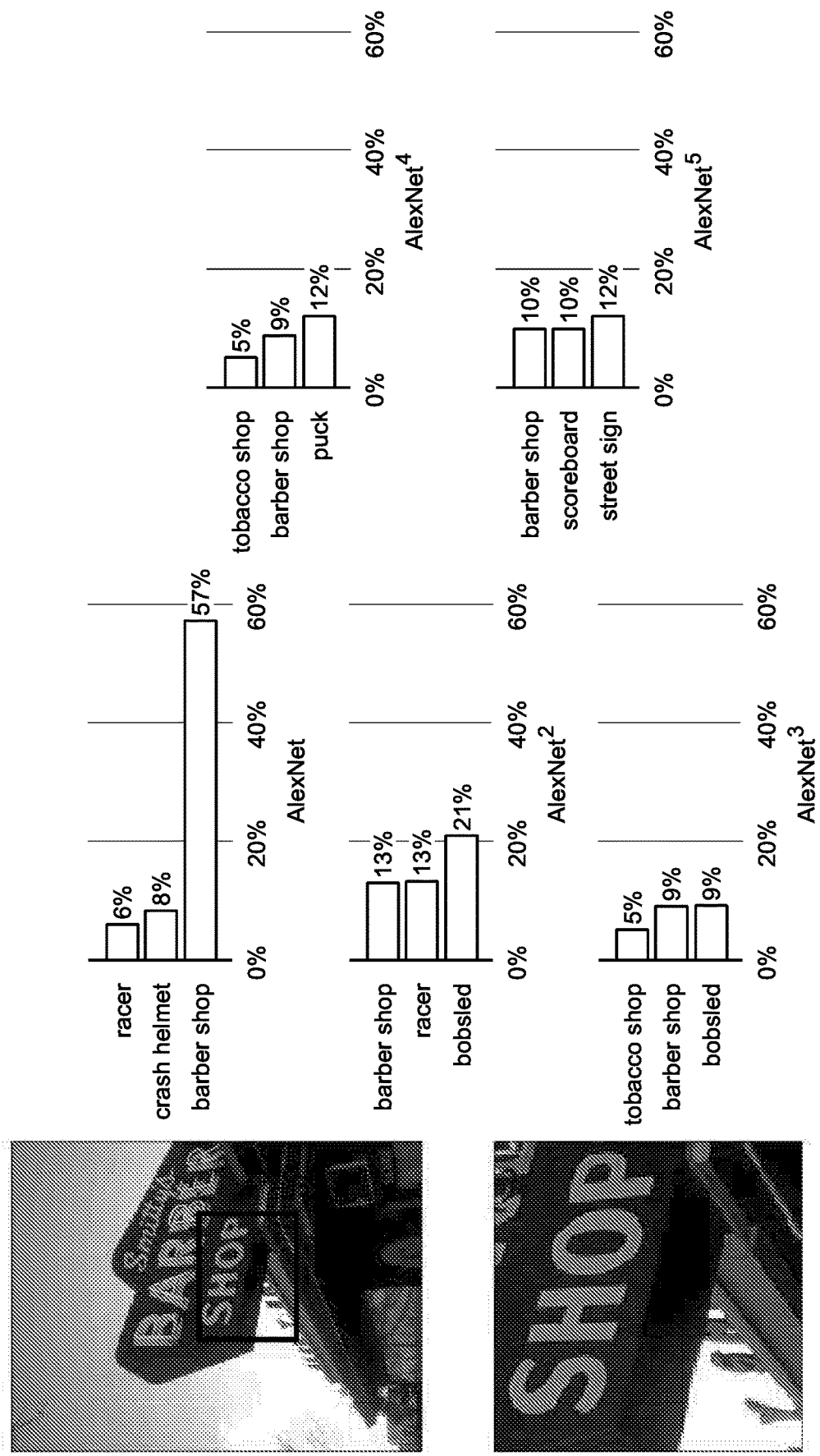
FIG. 7 illustrates an example in which a training image crop does not contain enough information to identify the image category as "barbershop".
Figure 8:
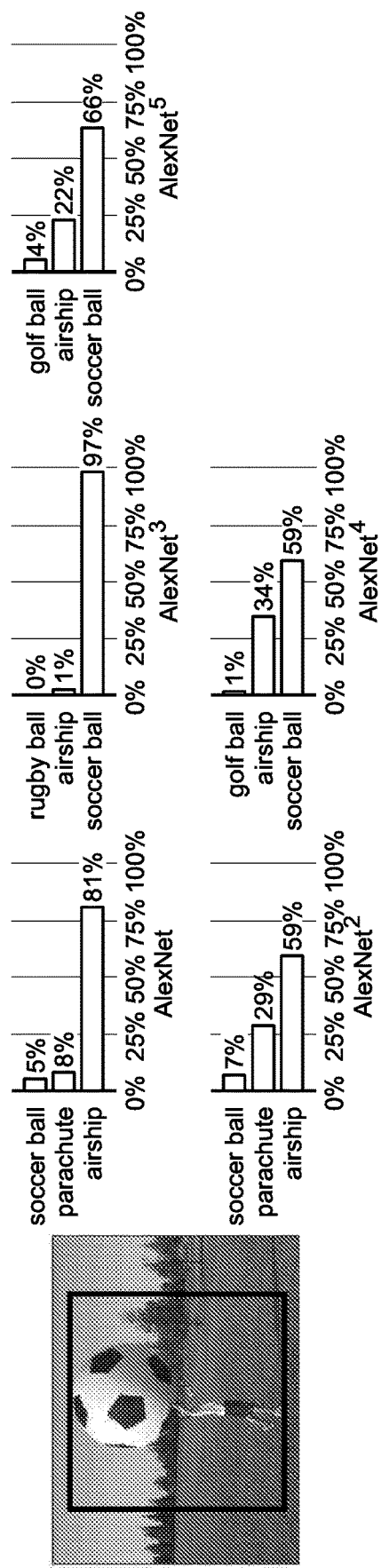
FIG. 8 illustrates an example of a "soccer ball" from the validation set of ImageNet.

Qualitative Results: Using a refinery to produce crop labels reduces over-fitting by providing more accurate labels during training. FIG. 7 illustrates an example in which a training image crop does not contain enough information to identify the image category as "barbershop". FIG. 7 shows the top three predictions for a crop of an image labelled "barbershop" in the ImageNet training set. AlexNet assigns the crop a label of barbershop with high confidence because it is trained on the ground-truth labels, which is overfitting towards the image level label. Successive Alex Net models overfit less, reducing the weight of the "barbershop" category and eventually assigning more probability to other plausible categories such as "streetsign" and "scoreboard". By using an AlexNet as a refinery, AlexNet[2] learns to generalize better. It produces a lower score for "barbershop", and a higher score for other categories. Generalization behavior may improve with successive rounds of label refining until AlexNet[5] produces a smooth distribution over plausible categories. FIG. 8 illustrates an example of a "soccer ball" from the validation set of ImageNet. FIG. 8 shows the top three predictions for an image labelled "soccer ball" in the ImageNet validation set. AlexNet incorrectly predicts "airship" with high confidence. This prediction is most likely because the main object is surrounded by blue sky, which is common for an airship but uncommon for a soccer ball. By using AlexNet as a refinery to train another AlexNet model the embodiments disclosed herein achieve a reduced score for "airship" and a higher score for "soccer ball". After several rounds of successive refining the embodiments disclosed herein achieve an AlexNet model that makes the correct prediction without completely forgetting the similarities between the soccer ball in the sky and an airship.

The embodiments disclosed herein address shortcomings commonly found in the labels of supervised learning pipelines. The embodiments disclosed herein introduce a solution to refine the labels during training in order to improve the generalization and the accuracy of learning models. The proposed Label Refinery enables dynamic labeling of augmented training crops with soft targets. Using a Label Refinery, the embodiments disclosed herein achieve a significant gain in the classification accuracy across a wide range of network architectures. The experimental evaluation shows improvement in the state-of-the-art accuracy for popular architectures including AlexNet, VGG, ResNet, MobileNet, and XNOR-Net. Particular embodiments disclosed herein may be able to adversarially modify the training samples to maximize the discrepancy in outputs between the Label Refinery and the model being trained. The embodiments disclosed herein empirically show that this use of adversarially modified training samples may improve the accuracy of smaller networks.

Figure 9:
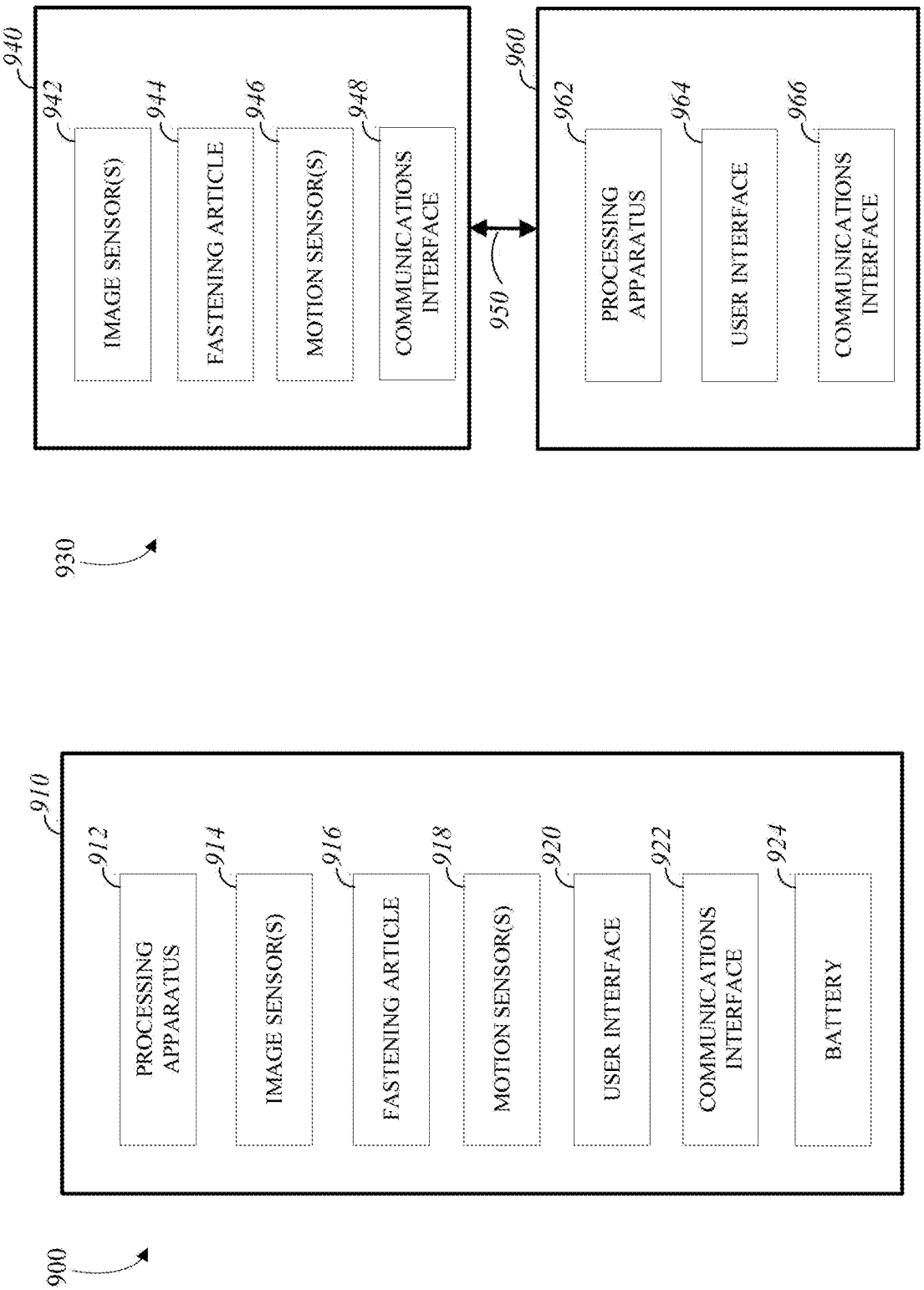
FIG. 9A illustrates a block diagram of an example of a system configured for image capture and object detection and/or classification with a neural network.
FIG. 9B illustrates a block diagram of an example of a system configured for image capture with object detection and classification.

FIG. 9A illustrates a block diagram of an example of a system 900 configured for image capture and object detection and/or classification with a neural network. The neural network is trained using labels for training data that have been refined as described above. The system 900 includes an image capture device 910 (e.g., a camera or a head-mounted display with an integrated image sensor) that includes a processing apparatus 912 that is configured to receive images from one or more image sensors 914. The image capture device 910 includes a fastening article 916 attached to the one or more image sensors 914 and configured to hold the one or more image sensors 914 in place on a portion (e.g., a head, a chest, or an arm) of a human body. The processing apparatus 912 may include a neural network (e.g., implemented as a software module or a specialized hardware module) configured to detect and/or classify objects appearing in images from the one or more image sensors 914. The neural network may be trained using the label refinement techniques described above. The image capture device 910 includes one or more motion sensors 918 configured to detect motion of the one or more image sensors 914. The image capture device 910 includes a user interface 920, which may allow a user to control image capture functions and/or view images. The image capture device 910 includes a communications interface 922 for transferring images to other devices. The image capture device 910 includes a battery 924 for powering the image capture device 910. For example, the system 900 may be used to implement processes described in this disclosure, such as the process 1000 of FIG. 10, the process 1100 of FIG. 11, and/or the process 1200 of FIG. 12.

The processing apparatus 912 may include one or more processors having single or multiple processing cores. The processing apparatus 912 may include memory, such as a random-access memory (RAM) device, flash memory, or any other suitable type of storage device, such as a non-transitory computer readable memory. The memory of the processing apparatus 912 may include executable instructions and data that may be accessed by one or more processors of the processing apparatus 912. For example, the processing apparatus 912 may include one or more DRAM modules, such as double data rate synchronous dynamic random-access memory (DDR SDRAM). In some implementations, the processing apparatus 912 may include a graphical processing unit (GPU). In some implementations, the processing apparatus 912 may include a digital signal processor (DSP). In some implementations, the processing apparatus 912 may include an application specific integrated circuit (ASIC). For example, the processing apparatus 912 may include a custom image signal processor. In some implementations, the processing apparatus 912 may have multiple processing units in different portions of the image capture device 910.

The one or more image sensors 914 are configured to capture images. The one or more image sensors 914 are configured to detect light of a certain spectrum (e.g., the visible spectrum or the infrared spectrum) and convey information constituting an image as electrical signals (e.g., analog or digital signals). For example, the one or more image sensors 914 may include charge-coupled devices (CCD) or active pixel sensors in complementary metal-oxide-semiconductors (CMOS). The one or more image sensors 914 may detect light incident through respective lens (e.g., a fisheye lens). In some implementations, the one or more image sensors 914 include digital-to-analog converters. In some implementations, the one or more image sensors 914 have respective fields of view that overlap. The one or more image sensors 914 are attached to the processing apparatus 912 as components of the image capture device 910.

The fastening article 916 is attached to the one or more image sensors 914 and configured to hold the one or more image sensors 914 in place on a portion of a human body. For example, the fastening article 916 may include glasses or goggles that, when worn by a human, fasten the one or more image sensors 914 in place on a head of the human. For example, the fastening article 916 may include a wristband that, when worn by a human, fastens the one or more image sensors 914 in place on an arm of the human. For example, the fastening article 916 may include a shirt or vest that, when worn by a human, fastens the one or more image sensors 914 in place on a chest of the human. For example, the fastening article 916 may include a band or strap of a headset configured for augmented reality applications and/or virtual reality applications that, when worn by a human, fastens the one or more image sensors 914 in place on a head of the human.

The one or more motion sensors 918 are configured to detect motion of the one or more image sensors 914. For example, the one or more motion sensors 918 may include parts of an inertial measurement unit (e.g., including gyroscopes, accelerometers, and/or magnetometers) that is mounted in a housing with the one or more image sensors 914. The processing apparatus 912 may be configured to determine a sequence of orientation estimates based on sensor data from the one or more motion sensors 918. For example, determining the sequence of orientation estimates may include applying quadratic estimation to sensor data from a plurality of the one or more motion sensors 918.

The image capture device 910 may include a user interface 920. For example, the user interface 920 may include an LCD display for presenting images and/or messages to a user. For example, the user interface 920 may include goggles or a headset with a display configured to support augmented reality applications, and the user interface 920 may be configured to incorporate metadata based on object detection and/or classification data from the neural network into images displayed through the user interface 920. For example, the user interface 920 may include a button or switch enabling a person to manually turn the image capture device 910 on and off. For example, the user interface 920 may include a shutter button for snapping pictures.

The image capture device 910 may include a communications interface 922, which may enable communications with a personal computing device (e.g., a smartphone, a tablet, a laptop computer, or a desktop computer). For example, the communications interface 922 may be used to receive commands controlling image capture and processing in the image capture device 910. For example, the communications interface 922 may be used to transfer image data to a personal computing device. For example, the communications interface 922 may include a wired interface, such as a high-definition multimedia interface (HDMI), a universal serial bus (USB) interface, or a FireWire interface. For example, the communications interface 922 may include a wireless interface, such as a Bluetooth interface, a ZigBee interface, and/or a Wi-Fi interface.

The image capture device 910 may include a battery 924 that powers the image capture device 910 and/or its peripherals. For example, the battery 924 may be charged wirelessly or through a micro-USE interface.

The processing apparatus 912 may include a neural network (e.g., a convolutional neural network) configured to detect and/or classify objects appearing in images from the one or more image sensors 914. In some implementations, the convolutional neural network may be implemented by software executed by the processing apparatus 912. For example, the processing apparatus 912 may be configured to access a first image from the one or more image sensors 914; apply a first neural network to data based on the first image to obtain classification data for one or more objects depicted in the first image, in which the first neural network has been trained by applying a second neural network to a set of data from a corpus of images to obtain a set of respective outputs, training the first neural network using the set of data as training examples and using the set of respective outputs as labels for the set of data, wherein the first neural network is not a subnetwork of the second neural network; adjust one or more parameters for the one or more image sensors 914 based on the classification data; capture a second image with the one or more image sensors 914 using the one or more adjusted parameters; and store, transmit (e.g., via the communications interface 922), or display (e.g., in the user interface 920) the second image. For example, the processing apparatus 912 may be configured to access a first image from the one or more image sensors 914; apply a first neural network to data based on the first image to obtain classification data for one or more objects depicted in the first image, in which the first neural network has been trained by generating a set of crops of images from a corpus of images, applying a second neural network to the set of crops to obtain a set of respective outputs, and training the first neural network using the set of crops as training examples and using the set of respective outputs as labels for the set of crops; adjust one or more parameters for the one or more image sensors 914 based on the classification data; capture a second image with the one or more image sensors 914 using the one or more adjusted parameters; and store, transmit (e.g., via the communications interface 922), or display (e.g., in the user interface 920) the second image. For example, the processing apparatus 912 may be configured to access a first image from the one or more image sensors 914; apply a neural network to data based on the first image to obtain classification data for a scene depicted in the first image, in which the neural network has been trained by applying the neural network to a set of data from a corpus of images to obtain a set of respective outputs, and training the neural network using the set of data as training examples and using the set of respective outputs as labels for the set of data; adjust one or more parameters for the one or more image sensors 914 based on the classification data; capture a second image with the one or more image sensors 914 using the one or more adjusted parameters; and store, transmit(e.g., via the communications interface 922), or display (e.g., in the user interface 920) the second image. For example, the neural network may be trained by implementing the process 1000 of FIG. 10.

FIG. 9B illustrates a block diagram of an example of a system 930 configured for image capture with object detection and classification. The system 930 includes an image capture device 940 and a personal computing device 960 that communicate via a communications link 950. The image capture device 940 includes one or more image sensors 942 that are configured to capture images. The image capture device 940 includes a communications interface 948 configured to transfer images via the communication link 950 to the personal computing device 960. The personal computing device 960 includes a processing apparatus 962 that is configured to receive, using the communications interface 966, images from the one or more image sensors 942. The image capture device 940 includes a fastening article 944 attached to the one or more image sensors 942 and configured to hold the one or more image sensors 942 in place on a portion (e.g., a head, a chest, or an arm) of a human body. The processing apparatus 962 may include a neural network (e.g., implemented as a software module or a specialized hardware module) configured to detect and/or classify objects appearing in images from the one or more image sensors 942. The neural network may be trained using the label refinement techniques described above. The image capture device 940 includes one or more motion sensors 946 configured to detect motion of the one or more image sensors 942. For example, the system 930 may be used to implement processes described in this disclosure, such as the process 1000 of FIG. 10, the process 1100 of FIG. 11, and/or the process 1200 of FIG. 12.

The one or more image sensors 942 are configured to capture images. The one or more image sensors 942 are configured to detect light of a certain spectrum (e.g., the visible spectrum or the infrared spectrum) and convey information constituting an image as electrical signals (e.g., analog or digital signals). For example, the one or more image sensors 942 may include charge-coupled devices (CCD) or active pixel sensors in complementary metal-oxide-semiconductors (CMOS). The one or more image sensors 942 may detect light incident through respective lenses (e.g., a fisheye lens). In some implementations, the one or more image sensors 942 include digital-to-analog converters. In some implementations, the one or more image sensors 942 have respective fields of view that overlap.

The fastening article 944 is attached to the one or more image sensors 942 and configured to hold the one or more image sensors 942 in place on a portion of a human body. For example, the fastening article 944 may include glasses or goggles that, when worn by a human, fasten the one or more image sensors 942 in place on a head of the human. For example, the fastening article 944 may include a wristband that, when worn by a human, fastens the one or more image sensors 942 in place on an arm of the human. For example, the fastening article 944 may include a shirt or vest that, when worn by a human, fastens the one or more image sensors 942 in place on a chest of the human. For example, the fastening article 944 may include a band or strap of a headset configured for augmented reality applications and/or virtual reality applications that, when worn by a human, fastens the one or more image sensors 942 in place on a head of the human.

The one or more motion sensors 946 are configured to detect motion of the one or more image sensors 942. For example, the one or more motion sensors 946 may include parts of an inertial measurement unit (e.g., including gyroscopes, accelerometers, and/or magnetometers) that is mounted in a housing with the one or more image sensors 942. The processing apparatus 962 may be configured to determine a sequence of orientation estimates based on sensor data from the one or more motion sensors 946. For example, determining the sequence of orientation estimates may include applying quadratic estimation to sensor data from a plurality of the one or more motion sensors 946.

The communications link 950 may be a wired communications link or a wireless communications link. The communications interface 948 and the communications interface 966 may enable communications over the communications link 950. For example, the communications interface 948 and the communications interface 966 may include a high-definition multimedia interface (HDMI), a universal serial bus (USB) interface, a FireWire interface, a Bluetooth interface, a ZigBee interface, and/or a Wi-Fi interface. For example, the communications interface 948 and the communications interface 966 may be used to transfer image data from the image capture device 940 to the personal computing device 960 for image signal processing (e.g., object detection, object classification, filtering, tone mapping, stitching, encoding) to generate output images and/or metadata based on image data from the one or more image sensors 942. For example, the communications interface 948 and the communications interface 966 may be used to transfer motion sensor data from the image capture device 940 to the personal computing device 960. For example, the communications interface 948 and the communications interface 966 may be used to transfer control signals to the image capture device 940 from the personal computing device 960 for controlling capture of images.

The processing apparatus 962 may include one or more processors having single or multiple processing cores. The processing apparatus 962 may include memory, such as a random-access memory (RAM) device, flash memory, or any other suitable type of storage device, such as a non-transitory computer readable memory. The memory of the processing apparatus 962 may include executable instructions and data that may be accessed by one or more processors of the processing apparatus 962. For example, the processing apparatus 962 may include one or more DRAM modules, such as double data rate synchronous dynamic random-access memory (DDR SDRAM). In some implementations, the processing apparatus 912 may include a graphical processing unit (GPU). In some implementations, the processing apparatus 962 may include a digital signal processor (DSP). In some implementations, the processing apparatus 962 may include an application specific integrated circuit (ASIC). For example, the processing apparatus 962 may include a custom image signal processor.

The personal computing device 960 may include a user interface 964. For example, the user interface 964 may include a touchscreen display for presenting images and/or messages to a user and receiving commands from a user. For example, the user interface 964 may include goggles or a headset with a display configured to support augmented reality applications, and the user interface 964 may be configured to incorporate metadata based on localization data and/or classification data from the convolutional neural network into images displayed through the user interface 964. For example, the user interface 964 may include a button or switch enabling a person to manually turn the personal computing device 960 on and off. In some implementations, commands (e.g., start recording video, stop recording video, snap photograph, or select tracking target) received via the user interface 964 may be passed on to the image capture device 940 via the communications link 950.

The processing apparatus 962 may include a neural network (e.g., a convolutional neural network) configured to detect and/or classify objects appearing in images from the one or more image sensors 942. In some implementations, the convolutional neural network may be implemented by software executed by the processing apparatus 962. For example, the processing apparatus 962 may be configured to access a first image from the one or more image sensors 942; apply a first neural network to data based on the first image to obtain classification data for one or more objects depicted in the first image, in which the first neural network has been trained by applying a second neural network to a set of data from a corpus of images to obtain a set of respective outputs, training the first neural network using the set of data as training examples and using the set of respective outputs as labels for the set of data, wherein the first neural network is not a subnetwork of the second neural network; adjust one or more parameters for the one or more image sensors 942 based on the classification data; capture a second image with the one or more image sensors 942 using the one or more adjusted parameters; and store, transmit (e.g., via the communications interface 966), or display (e.g., in the user interface 964) the second image. For example, the processing apparatus 962 may be configured to access a first image from the one or more image sensors 942; apply a first neural network to data based on the first image to obtain classification data for one or more objects depicted in the first image, in which the first neural network has been trained by generating a set of crops of images from a corpus of images, applying a second neural network to the set of crops to obtain a set of respective outputs, and training the first neural network using the set of crops as training examples and using the set of respective outputs as labels for the set of crops; adjust one or more parameters for the one or more image sensors 942 based on the classification data; capture a second image with the one or more image sensors 942 using the one or more adjusted parameters; and store, transmit (e.g., via the communications interface 966), or display (e.g., in the user interface 964) the second image. For example, the processing apparatus 962 may be configured to access a first image from the one or more image sensors 942;

apply a neural network to data based on the first image to obtain classification data for a scene depicted in the first image, in which the neural network has been trained by applying the neural network to a set of data from a corpus of images to obtain a set of respective outputs, and training the neural network using the set of data as training examples and using the set of respective outputs as labels for the set of data; adjust one or more parameters for the one or more image sensors 942 based on the classification data; capture a second image with the one or more image sensors 942 using the one or more adjusted parameters; and store, transmit(e.g., via the communications interface 966), or display (e.g., in the user interface 964) the second image. For example, the convolutional neural network may be trained by implementing the process 1000 of FIG. 10.

Figure 10:
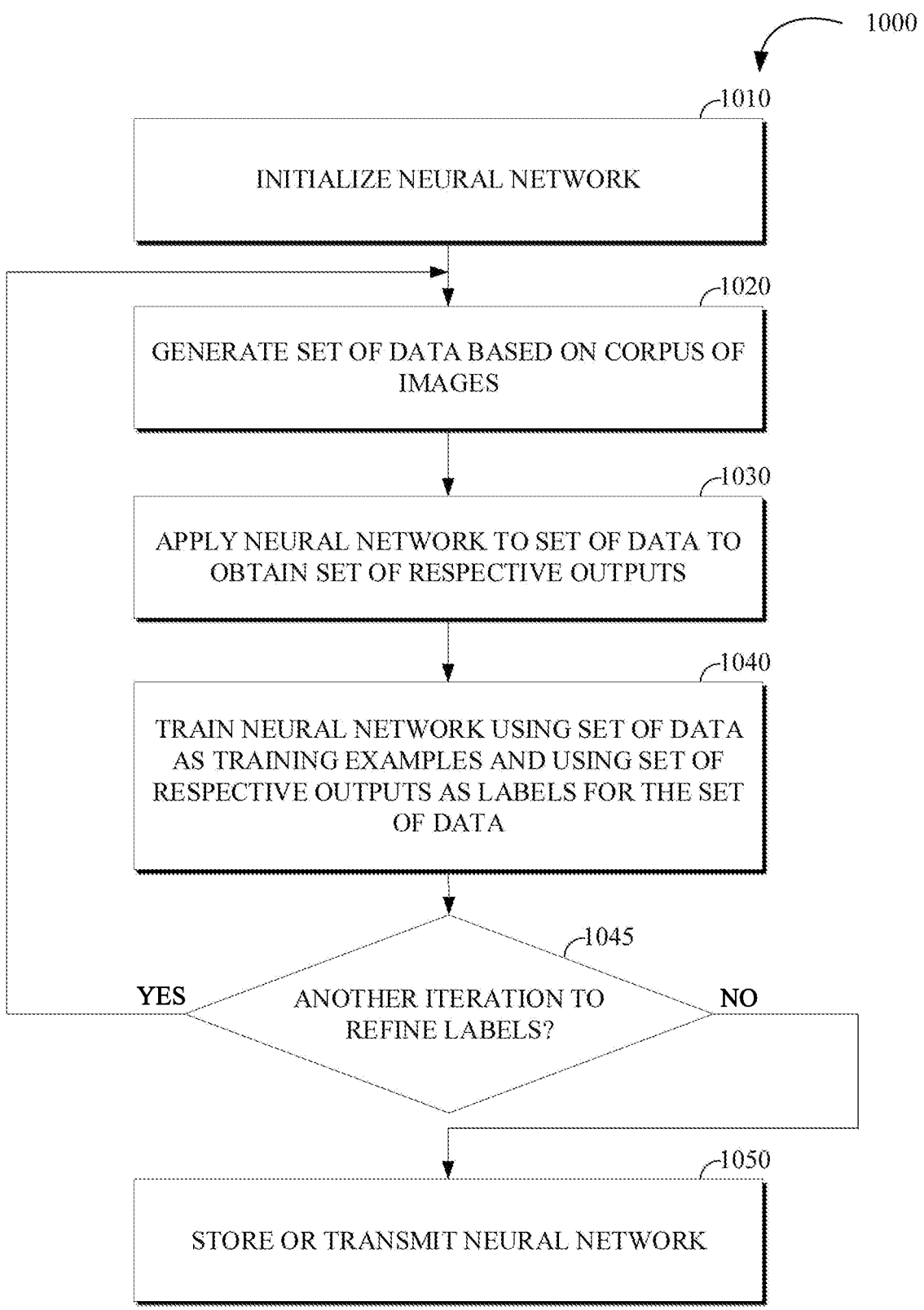
FIG. 10 illustrates a flowchart of an example of a process for training a neural network (e.g., a convolutional neural network) with dynamically refined labels for training data.

FIG. 10 illustrates a flowchart of an example of a process 1000 for training a neural network (e.g., a convolutional neural network) with dynamically refined labels for training data. The process 1000 may be used to implement label refinement with one or more neural networks as described above (e.g., "Label Refinery"). The process 1000 includes initializing 1010 a neural network; generating 1020 a set of data based on a corpus of images; applying 1030 a neural network to the set of data to obtain a set of respective outputs; training 1040 a neural (e.g., the same neural network or a different neural network) using the set of data as training examples and using the set of respective outputs as labels for the set of data. The process 1000 includes checking 1045 whether another iteration label refinement will be performed. When another iteration is performed, a new set of data may be generated 1020, the latest neural network may be applied 1030 to the new set of data to obtain a new set of respective outputs, and a neural network (e.g., the same neural network or a different neural network) may be trained 1040 using the new set of data as training examples and using the new set of respective outputs as labels for the new set of data. The process 1000 includes, when the last iteration has been performed, storing or transmitting 1050 the neural network that results from the latest training 1040. For example, the process 1000 may be implemented by the system 900 of FIG. 9A or the system 930 of FIG. 9B. For example, the process 1000 may be implemented by an image capture device, such as the image capture device 910 shown in FIG. 9A. For example, the process 1000 may be implemented by a personal computing device, such as the personal computing device 960. For example, the process 1000 may be implemented by another type computing device (e.g., a networked server device) that includes a processing apparatus. In some implementations, the neural network state or model that results from the process 1000 is utilized for inference (e.g., for object detection and/or classification) by a different computing device than the computing device used to implement the process 1000.

The process 1000 includes initializing 1010 a neural network to be used for label refinement. In some implementations, a neural network may be initialized 1010 by training using ground truth labels supplied with a corpus of images (e.g., image level labels). For example, data (e.g., a random crop of an image) in a set of data used to train the network may inherit a ground truth label from an image in the corpus from which it is derived. These ground truth labels may have limitations, as described above, but may none-the-less serve to provide a reasonable starting point for iterative label refinement. For example, the network that is initialized 1010 may be the network Coithat is described above. In some implementations, a neural network may be initialized 1010 by using weights and/or other neural network parameters that are determined randomly.

The process 1000 includes generating 1020 a set of data (e.g., a set images or portions of images with or without pre-processing applied) based on a corpus of images. For example, the corpus of images may include many examples of the images depicting the types of objects and or scenes that are sought to be detected and/or classified. In some implementations, the process 1000 includes generating 1020 a set of crops of images from a corpus of images. For example, random crops (e.g., at 8%, 16%, 32%, or 50% of the area of an original image) of images from the corpus of images may be generated 1020. In some implementations, generating 1020 a set of crops includes applying adversarial jittering to a crop of an image from the corpus of images to obtain an adversarial crop that is included in the set of crops. For example, applying adversarial jittering to the crop may include applying one or more steps of gradient ascent to the crop based on a Kullback-Leibler divergence loss function. In some implementations, the process 1000 includes generating 1020 a set of transforms (e.g., a discrete cosine transform or a discrete wavelet transform) of images or portions of images from a corpus of images. In some implementations, the set of data generated 1020 includes selecting whole, unmodified images from a corpus of images that are accessed format (e.g., using a rasterization) suitable for input to a neural network.

The process 1000 includes applying 1030 a neural network to the set of data from the corpus of images to obtain a set of respective outputs. For example, data constituting a member (e.g., a crop, an image, or a transform) of the set of data may be input to the neural network to apply 1030 the neural network and a respective output (e.g., a tuple of class probabilities) for the data may be obtained as a result. This respective output for the data may be associated with the data as a label (e.g., a refined label).

The process 1000 includes training 1040 a neural network (e.g., the same neural network or a different neural network) using the set of data as training examples and using the set of respective outputs as labels for the set of data. In some implementations, the neural network (i.e., the same neural network that was applied 1030 to determine the set ofrespective outputs) is trained 1040 using the set of data as training examples and using the set of respective outputs as labels for the set of data. In some implementations, a first neural network is applied 1030 to the set of data from the corpus of images to obtain a set of respective outputs, and a second neural network is trained 1040 using the set of data as training examples and using the set of respective outputs as labels for the set of data, where the second neural network may have a different structure that the first neural network. For example, the first neural network and the second neural network may be chosen to be different to implement cross-architecture refinement of labels, as described above (e.g., using ResNet-50 neural network and a VGG19 neural network). For example, the process 1000 may include applying 1030 a first neural network to a set of data from a corpus of images to obtain a set of respective outputs, and training 1040 a second neural network using the set of data as training examples and using the set of respective outputs as labels for the set of data, wherein the second neural network is not a subnetwork of the first neural network. For example, the first neural network and the second neural network may lack layers that are common to the first neural network and the second neural network. In some implementations, the first neural network and the second neural network may both accept crops as input. For example, the process 1000 may include applying 1030 a first neural network to the set of crops to obtain a set of respective outputs, and training 1040 a second neural network using the set of crops as training examples and using the set of respective outputs as labels for the set of crops. In some implementations, the first neural network is the second neural network.

The process 1000 includes checking 1045 whether another iteration label refinement will be performed. For example, a fixed number of iterations (e.g., 1, 2, 4, or 8 iterations) may be performed and checking 1045 whether another iteration label refinement will be performed may include checking 1045 the value of an iteration counter. In some implementations, iterations to further refine the labels for training may be performed until a condition is satisfied (e.g., the model error on the training data or on a separate body of test data is below a threshold), and checking 1045 whether another iteration label refinement will be performed may include checking 1045 this condition. In some implementations, iterations to further refine the labels for training may be performed until a condition is satisfied or a limit on the iteration count is reached.

When another iteration is performed, a new set of data may be generated 1020, the latest neural network may be applied 1030 to the new set of data to obtain a new set of respective outputs, and a neural network (e.g., the same neural network or a different neural network) may be trained 1040 using the new set of data as training examples and using the new set of respective outputs as labels for the new set of data. For example, the process 1000 may include applying 1030 the neural network to a second set of data from the corpus of images to obtain a second set of respective outputs, and training 1040 the neural network using the second set of data as training examples and using the second set of respective outputs as labels for the second set of data.

The process 1000 includes, when the last iteration has been performed, storing or transmitting 1050 the neural network (e.g., the second neural network) that results from the latest training 1040. For example, the neural network (e.g., the model or state of the neural network) may be transmitted 1050 to an external device (e.g., a personal computing device) for display or storage. For example, the neural network may be stored 1050 in memory of a processing apparatus (e.g., the processing apparatus 912 or the processing apparatus 962) for later use to detect and/or classify objects appearing in images. For example, the neural network may be transmitted 1050 via the communications interface 922.

Figure 11:
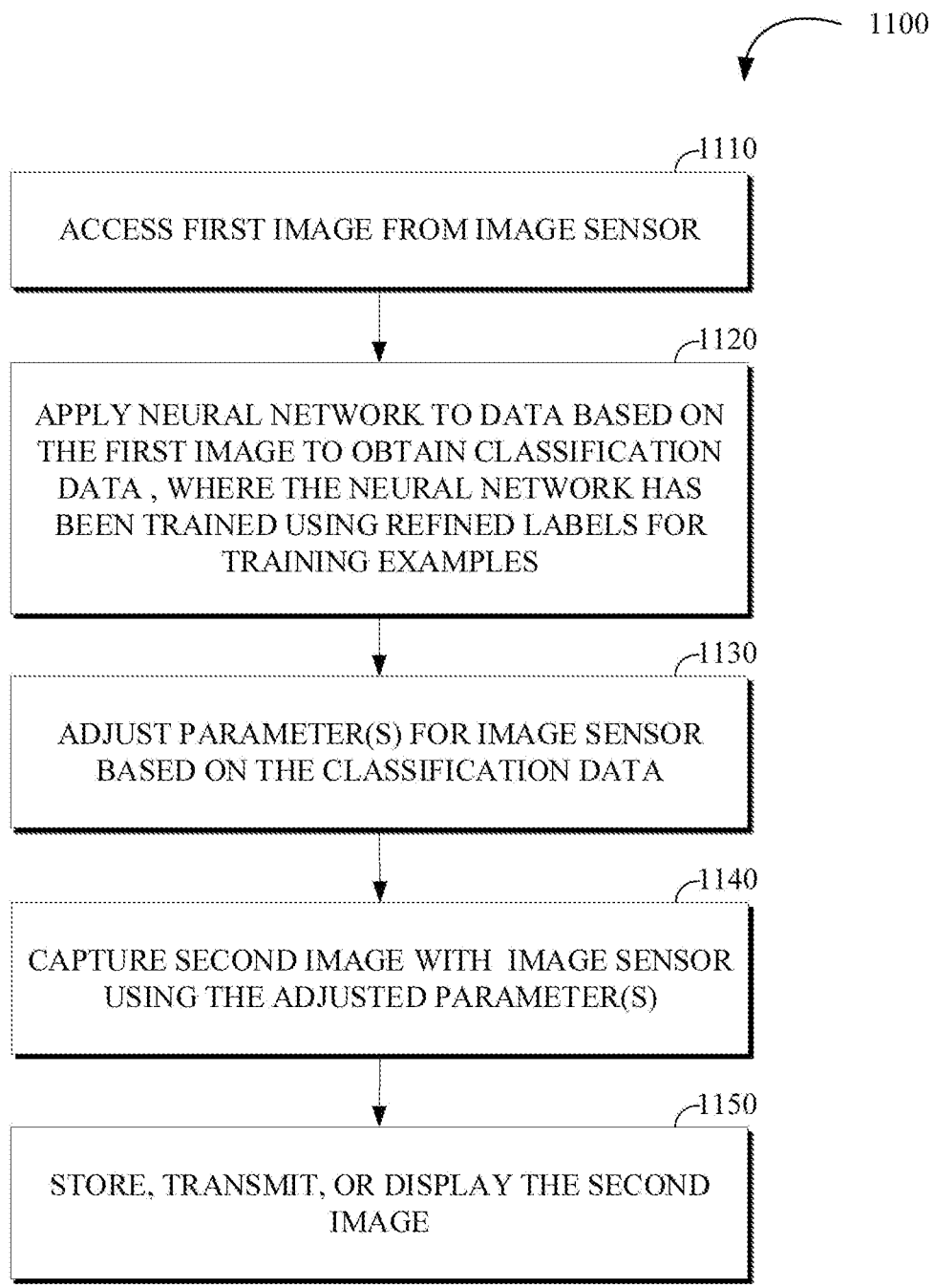
FIG. 11 illustrates a flowchart of an example of a process for capturing an image using one or more image sensor parameters that are determined based on scene classification obtained with a neural network.

FIG. 11 illustrates a flowchart of an example of a process 1100 for capturing an image using one or more image sensor parameters that are determined based on scene classification obtained with a neural network. The process 1100 includes accessing 1110 a first image from an image sensor; applying 1120 a neural network to data based on the first image to obtain classification data for a scene depicted in the first image, in which the neural network has been trained using label refinement; adjusting 1130 one or more parameters for the image sensor based on the classification data; capturing 1140 a second image with the image sensor using the one or more adjusted parameters; and storing, transmitting, or displaying 1150 the second image. For example, the process 1100 may be implemented by the system 900 of FIG. 9A or the system 930 of FIG. 9B. For example, the process 1100 may be implemented by an image capture device, such as the image capture device 910 shown in FIG. 9A. For example, the process 1100 may be implemented by a personal computing device, such as the personal computing device 960.

The process 1100 includes accessing 1110 a first image from an image sensor. The image sensor may be part of an image capture system (e.g., the image capture device 910, or the image capture device 940). In some implementations, the image sensor may be attached to a processing apparatus that implements the process 1100. For example, the image may be accessed 1110 by receiving the image from the image sensor via a bus. In some implementations, the image may be accessed 1110 via a communications link (e.g., the communications link 950). For example, the image may be accessed 1110 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be accessed 1110 via the communications interface 966. For example, the image may be accessed 1110 as an input image signal, which may represent each pixel value in a defined format, such as in a RAW image format. In some implementations, the image may be a frame of a video (i.e., one of a sequence of images of a video). In some implementations, the image is accessed 1110 directly from the image sensor without intermediate image processing. In some implementations, the image is accessed 1110 after being subjected to intermediate image processing (e.g., spatial noise reduction and/or temporal noise reduction). In some implementations, the image is accessed 1110 by retrieving the image from a memory or other data storage apparatus.

The process 1100 includes applying 1120 a neural network to data based on the first image to obtain classification data for a scene and/or one or more objects depicted in the first image, in which the neural network has been trained using label refinement (e.g., by implementing the process 1000 of FIG. 10). For example, the process 1100 may include applying 1120 a neural network to data based on the first image to obtain classification data for a scene depicted in the first image, in which the neural network has been trained by applying the neural network to a set of data from a corpus of images to obtain a set of respective outputs, and training the neural network using the set of data as training examples and using the set of respective outputs as labels for the set of data. For example, the process 1100 may include applying 1120 a first neural network to data based on the first image to obtain classification data for one or more objects depicted in the first image, in which the first neural network has been trained by generating a set of crops of images from a corpus of images, applying a second neural network to the set of crops to obtain a set of respective outputs, and training the first neural network using the set of crops as training examples and using the set of respective outputs as labels for the set of crops. For example, the process 1100 may include applying 1120 a first neural network to data based on the first image to obtain classification data for one or more objects depicted in the first image, in which the first neural network has been trained by applying a second neural network to a set of data from a corpus of images to obtain a set of respective outputs, training the first neural network using the set of data as training examples and using the set of respective outputs as labels for the set of data, wherein the first neural network is not a subnetwork of the second neural network.

The process 1100 includes adjusting 1130 one or more parameters for the image sensor based on the classification data. For example, the one or more parameters may include an exposure time or shutter speed. For example, the one or more parameters may include a high dynamic range setting. For example, the one or more parameters may include an electronic rolling shutter setting. In some implementations, a scene depicted in the first image is classified (e.g., as an outdoor, indoor, mountain, nighttime, low-light scene) based on the classification data. For example, a preconfigured set of values for the one or more parameters of the image sensor may be associated with a respective scene class and the one or more parameters may be adjusted 1130 to take a set of one or more values associated with a class of scene that is identified or selected for the first image. For example, the configuration of the image sensor may be dynamically adapted to a current scene just before image capture in response to user input (e.g., pressing a shutter button or icon on a camera device, such a smartphone).

The process 1100 includes capturing 1140 a second image with the image sensor using the one or more adjusted parameters.

The process 1100 includes storing, transmitting, or displaying 1150 the second image. For example, the second image may be transmitted 1140 to an external device (e.g., a personal computing device) for display or storage. For example, the second image may be stored 1140 in memory of a processing apparatus (e.g., the processing apparatus 912 or the processing apparatus 962). For example, the second image may be displayed 1140 in the user interface 920 or in the user interface 964. For example, the second image may be transmitted 1140 via the communications interface 922.

Figure 12:
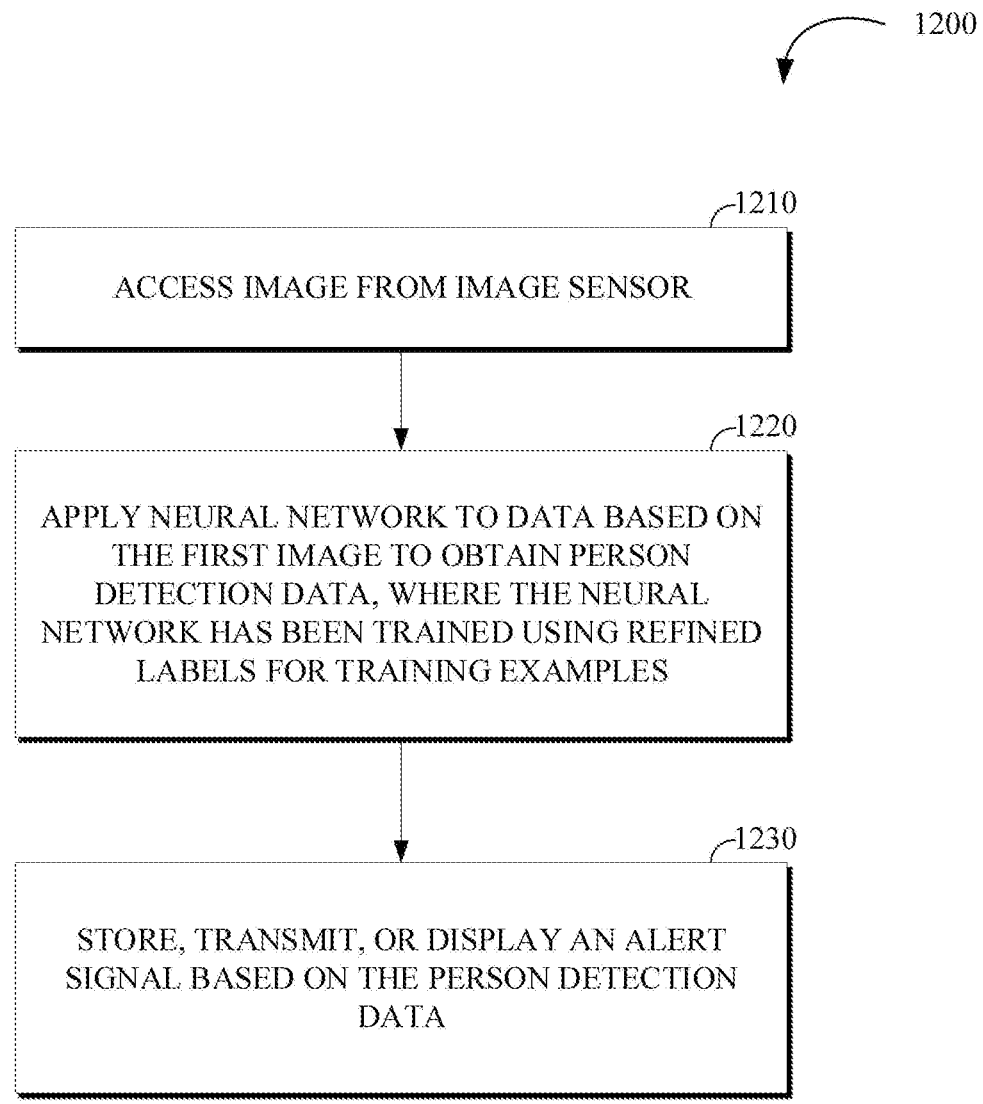
FIG. 12 illustrates a flowchart of an example of a process for detecting a person depicted in an image captured by an image sensor (e.g., of a security camera) and invoking an alert message responsive to the detecting the person.

FIG. 12 illustrates a flowchart of an example of a process 1200 for detecting a person depicted in an image captured by an image sensor (e.g., of a security camera) and invoking an alert message responsive to the detecting the person. The process 1200 includes accessing 1210 an image from an image sensor; applying 1220 a neural network to data based on the image to obtain person detection data for a scene depicted in the image, in which the neural network has been trained using label refinement; and storing, transmitting, or displaying 1230 an alert signal based on the person detection data. For example, the process 1200 may be implemented to monitor video from a security camera. For example, the process 1200 may be implemented by the system 900 of FIG. 9A or the system 930 of FIG. 9B. For example, the process 1200 may be implemented by an image capture device, such as the image capture device 910 shown in FIG. 9A. For example, the process 1200 may be implemented by a personal computing device, such as the personal computing device 960.

The process 1200 includes accessing 1210 an image from an image sensor. The image sensor may be part of an image capture system (e.g., the image capture device 910, or the image capture device 940). In some implementations, the image sensor may be attached to a processing apparatus that implements the process 1200. For example, the image may be accessed 1210 by receiving the image from the image sensor via a bus. In some implementations, the image may be accessed 1210 via a communications link (e.g., the communications link 950). For example, the image may be accessed 1210 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be accessed 1210 via the communications interface 966. For example, the image may be accessed 1210 as an input image signal, which may represent each pixel value in a defined format, such as in a RAW image format. In some implementations, the image may be a frame of a video (i.e., one of a sequence of images of a video). In some implementations, the image is accessed 1210 directly from the image sensor without intermediate image processing. In some implementations, the image is accessed 1210 after being subjected to intermediate image processing (e.g., spatial noise reduction and/or temporal noise reduction). In some implementations, the image is accessed 1210 by retrieving the image from a memory or other data storage apparatus.

The process 1200 includes applying 1220 a neural network to data based on the image to obtain person detection data for a scene depicted in the image, in which the neural network has been trained using label refinement (e.g., by implementing the process 1000 of FIG. 10). For example, the process 1200 may include applying 1220 a neural network to data based on the image to obtain person detection data for a scene depicted in the image, in which the neural network has been trained by applying the neural network to a set of data from a corpus of images to obtain a set of respective outputs, and training the neural network using the set of data as training examples and using the set of respective outputs as labels for the set of data. For example, the process 1200 may include applying 1220 a first neural network to data based on the image to obtain person detection data for a scene depicted in the image, in which the first neural network has been trained by generating a set of crops of images from a corpus of images, applying a second neural network to the set of crops to obtain a set of respective outputs, and training the first neural network using the set of crops as training examples and using the set of respective outputs as labels for the set of crops. For example, the process 1200 may include applying 1220 a first neural network to data based on the image to obtain person detection data for a scene depicted in the image, in which the first neural network has been trained by applying a second neural network to a set of data from a corpus of images to obtain a set of respective outputs, training the first neural network using the set of data as training examples and using the set of respective outputs as labels for the set of data, wherein the first neural network is not a subnetwork of the second neural network.

The process 1200 includes storing, transmitting, or displaying 1230 an alert signal based on the person detection data. For example, the alert signal may include text (e.g., "intruder alert") and/or or a color coded bounding box that is overlaid on a portion of the image corresponding to a detected person. For example, the alert signal may be transmitted 1230 to an external device (e.g., a personal computing device) for display or storage. For example, the alert signal may be stored 1230 in memory of a processing apparatus (e.g., the processing apparatus 912 or the processing apparatus 962). For example, the alert signal may be displayed 1230 in the user interface 920 or in the user interface 964. For example, the alert signal may be transmitted 1230 via the communications interface 922.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

Figure 13:
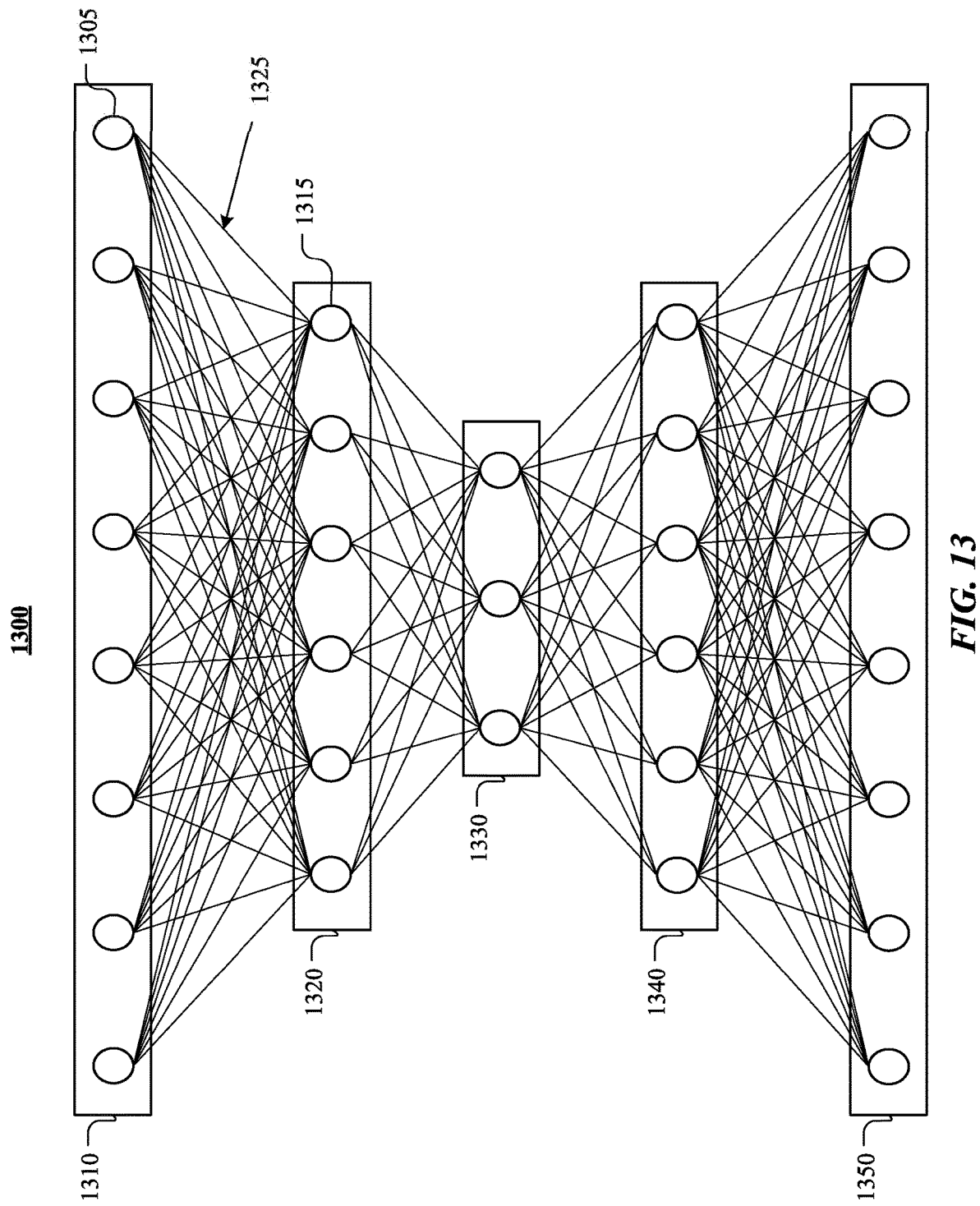
FIG. 13 illustrates an example artificial neural network.

FIG. 13 illustrates an example artificial neural network ("ANN") 1300. In particular embodiments, an ANN may refer to a computational model comprising one or more nodes. Example ANN 1300 may comprise an input layer 1310, hidden layers 1320, 1330, 1340, and an output layer 1350. Each layer of the ANN 1300 may comprise one or more nodes, such as a node 1305 or a node 1315. In particular embodiments, each node of an ANN may be connected to another node of the ANN. As an example and not by way of limitation, each node of the input layer 1310 may be connected to one of more nodes of the hidden layer 1320. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 13 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way oflimitation, although FIG. 13 depicts a connection between each node of the input layer 1310 and each node of the hidden layer 1320, one or more nodes of the input layer 1310 may not be connected to one or more nodes of the hidden layer 1320.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1320 may comprise the output of one or more nodes of the input layer 1310. As another example and not by way of limitation, the input to each node of the output layer 1350 may comprise the output of one or more nodes of the hidden layer 1340. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$Fk(sk) = k'_{1+e}$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitabld function Fk(sk), where sk may be the effective input to node k In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1325 between the node 1305 and the node 1315 may have a weighting coefficient of 0.4, which may indicate that 0.4 multiplied by the output of the node 1305 is used as an input to the node 1315. As another example and not by way of limitation, the output Yk of node k may be Yk=Fk(sk), where Fk may be the activation function corresponding to node k, sk=li wjkXj) may be the effective input to node k, Xj may be the output of a node j connected to node k, and Wjk may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1300 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Figure 14:
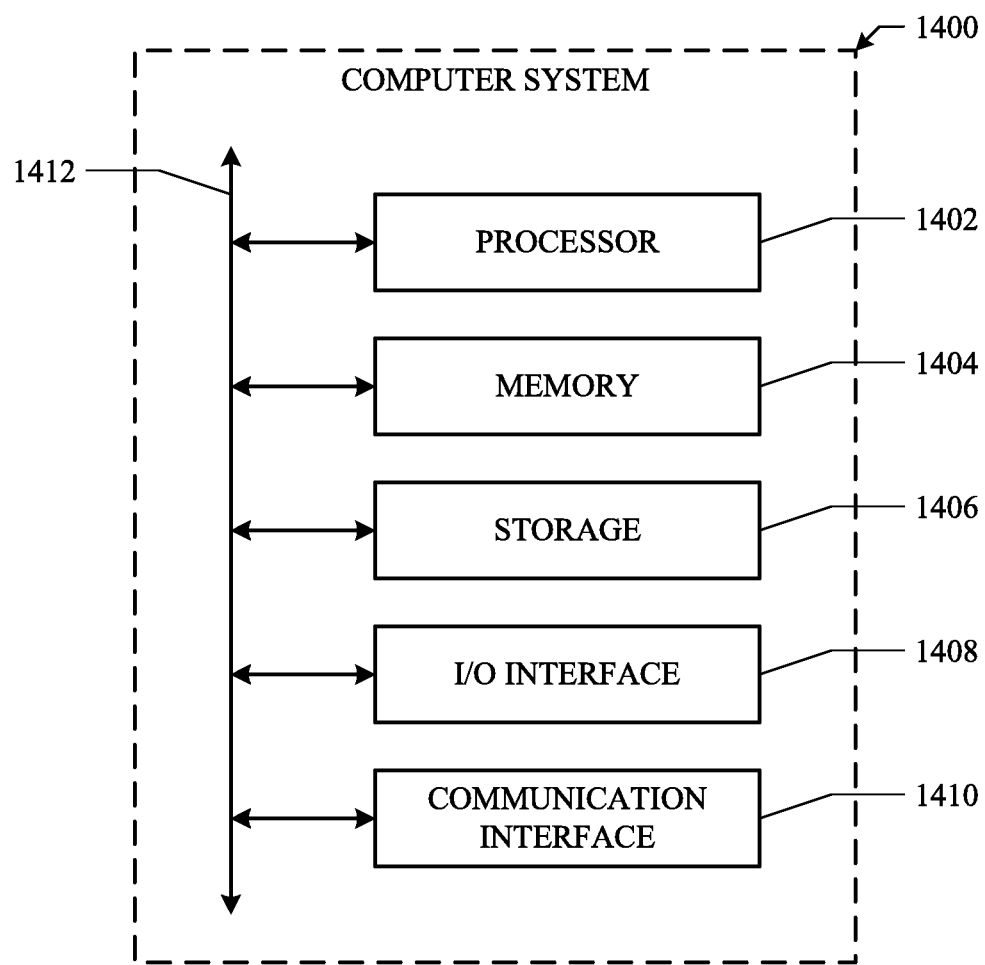
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (1/0) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, 1/0 interface 1408 includes hardware, software, or both, providing one or more interfaces for communication between computer system 1400 and one or more 1/0 devices. Computer system 1400 may include one or more of these 1/0 devices, where appropriate. One or more of these 1/0 devices may enable communication between a person and computer system 1400. As an example and not by way of limitation, an 1/0 device may include a keyboard, keypad, microphone, monitor, mouse, printer, scanner, speaker, still camera, stylus, tablet, touch screen, trackball, video camera, another suitable 1/0 device or a combination of two or more of these. An 1/0 device may include one or more sensors. This disclosure contemplates any suitable 1/0 devices and any suitable 1/0 interfaces 1408 for them. Where appropriate, 1/0 interface 1408 may include one or more device or software drivers enabling processor 1402 to drive one or more of these 1/0 devices. 1/0 interface 1408 may include one or more 1/0 interfaces 1408, where appropriate. Although this disclosure describes and illustrates a particular 1/0 interface, this disclosure contemplates any suitable 1/0 interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (MC) or network adapter for communicating with an Ethernet or other wire-based network or a wireless MC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   obtaining an image from an image sensor of a computing device;
   obtaining, by the computing device, person detection data from the image by applying, to the image, a neural network that has been trained using training data that includes a set of crops of a training image and a set of respective outputs from another neural network that are applied as labels for the set of crops; and generating an alert signal with the computing device based on the person detection data.

2. The method of claim 1, wherein the image is an image frame of a video from a camera.

3. The method of claim 1, wherein the alert signal comprises a bounding box that is overlaid on a portion of the image.

4. The method of claim 3, wherein the bounding box is a color-coded bounding box.

5. The method of claim 3, further comprising storing the image having the bounding box at the computing device that applies the neural network to the image.

6. The method of claim 3, further comprising transmitting the image having the bounding box from the computing device that applies the neural network to the image to a remote system.

7. The method of claim 1, wherein the alert signal comprises an intruder alert.

8. The method of claim 1, further comprising:

modifying, by the computing device, at least one parameter for operating the image sensor based on the person detection data; and obtaining another image with the image sensor using the at least one modified parameter.

9. A device, comprising:

an image sensor; and at least one processor configured to:

obtain an image from the image sensor;

obtain person detection data from the image by applying, to the image, a neural network that has been trained using training data that includes a set of crops of a training image and a set of respective outputs from another neural network that are applied as labels for the set of crops; and generate an alert signal based on the person detection data.

10. The device of claim 9, wherein the image is an image frame of a video from a camera.

11. The device of claim 9, wherein the alert signal comprises a bounding box that is overlaid on a portion of the image.

12. The device of claim 11, wherein the bounding box is a color-coded bounding box.

13. The device of claim 11, further comprising storing the image having the bounding box at the device that applies the neural network to the image.

14. The device of claim 11, further comprising transmitting the image having the bounding box from the device that applies the neural network to the image to a remote system.

15. A non-transitory machine-readable medium comprising instructions that, when executed by one or more processors, cause the one or more processors to perform operations comprising:

obtaining an image from an image sensor of a computing device;

obtaining, by the computing device, person detection data from the image by applying, to the image, a neural network that has been trained using training data that includes a set of crops of a training image and a set of respective outputs from another neural network that are applied as labels for the set of crops; and generating an alert signal with the computing device based on the person detection data.

16. The non-transitory machine-readable medium of claim 15, wherein the image is an image frame of a video from a camera.

17. The non-transitory machine-readable medium of claim 15, wherein the alert signal comprises a bounding box that is overlaid on a portion of the image.

18. The non-transitory machine-readable medium of claim 17, wherein the bounding box is a color-coded bounding box.

19. The non-transitory machine-readable medium of claim 17, wherein the operations further comprise storing the image having the bounding box at the computing device that applies the neural network to the image.

20. The non-transitory machine-readable medium of claim 17, wherein the operations further comprise transmitting the image having the bounding box from the computing device that applies the neural network to the image to a remote system.

* * * * *

UNITED STATES PATENT AND TRADEMARK OFFICE
CERTIFICATE OF CORRECTION

PATENT NO. : 12,315,053 B2
APPLICATION NO. : 18/544288
DATED : May 27, 2025
INVENTOR(S) : Hessam Bagherinezhad et al.

Page 1 of 1

It is certified that error appears in the above-identified patent and that said Letters Patent is hereby corrected as shown below:

On the Title Page

Under Column No. 1, Related U.S. Application Data: Replace "(60)", with --(62)--.

Signed and Sealed this
Twenty-sixth Day of August, 2025

Coke Morgan Stewart
*Acting Director of the United States Patent and Trademark Office*